United States Patent
Nishide et al.

(10) Patent No.: US 9,871,253 B2
(45) Date of Patent: Jan. 16, 2018

(54) ION-CONDUCTIVE FUSED-RING QUINONE POLYMER, ELECTRODE ACTIVE MATERIAL AND SECONDARY BATTERY

(71) Applicants: WASEDA UNIVERSITY, Shinjuku-ku, Tokyo (JP); NISSAN CHEMICAL INDUSTRIES, LTD., Chiyoda-ku, Tokyo (JP)

(72) Inventors: Hiroyuki Nishide, Tokyo (JP); Kenichi Oyaizu, Tokyo (JP); Takuma Kawai, Tokyo (JP); Takuji Yoshimoto, Funabashi (JP)

(73) Assignees: WASEDA UNIVERSITY, Tokyo (JP); NISSAN CHEMICAL INDUSTRIES, LTD., Tokyo (JP)

(*) Notice: Subject to any disclaimer, the term of this patent is extended or adjusted under 35 U.S.C. 154(b) by 17 days.

(21) Appl. No.: 15/064,789

(22) Filed: Mar. 9, 2016

(65) Prior Publication Data

US 2017/0077517 A1 Mar. 16, 2017

(30) Foreign Application Priority Data

Sep. 11, 2015 (JP) ................................. 2015-179550
Mar. 3, 2016 (JP) ................................. 2016-040929

(51) Int. Cl.
*H01B 1/12* (2006.01)
*H01M 4/60* (2006.01)
(Continued)

(52) U.S. Cl.
CPC ............ *H01M 4/608* (2013.01); *C08G 65/38* (2013.01); *C08G 65/48* (2013.01); *H01B 1/124* (2013.01);
(Continued)

(58) Field of Classification Search
CPC ............. H01M 10/0525; H01M 12/06; H01M 2004/028; H01M 4/608; H01M 4/606;
(Continued)

(56) References Cited

U.S. PATENT DOCUMENTS

2013/0122367 A1* 5/2013 Otsuka ................ H01M 4/5835
429/213
2014/0308581 A1* 10/2014 Yao ....................... H01M 4/606
429/213

FOREIGN PATENT DOCUMENTS

JP 2002-117852 A 4/2002
JP 2004006067 A1 * 1/2004 ....... C08G 2261/312
(Continued)

OTHER PUBLICATIONS

Choi, W. et al., Aqueous Electrochemistry of Poly(vinylanthraquinone) for Anode-Active Materials in High-Density and Rechargeable Polymer/Air Batteries, J. Am. Chem. Soc., 133, 19839-19843 (2011).*
(Continued)

*Primary Examiner* — Mark Kopec
*Assistant Examiner* — Jaison P Thomas
(74) *Attorney, Agent, or Firm* — Birch, Stewart, Kolasch and Birch, LLP

(57) ABSTRACT

A ion-conductive fused-ring quinone polymer includes recurring units of formula (1) and/or (2) below
(Continued)

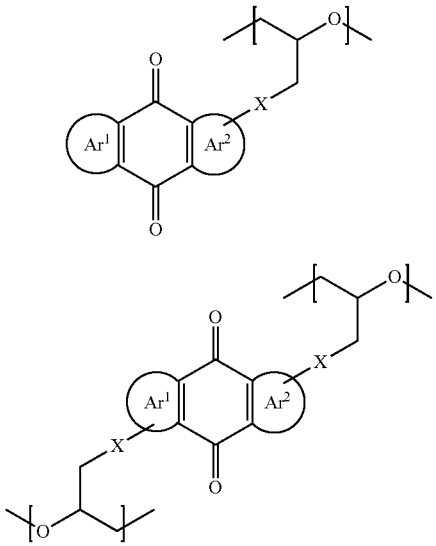

wherein each X is independently a single bond or a divalent group, and $A^1$ and $A^2$ are each independently an aromatic hydrocarbon ring or an oxygen atom or sulfur atom-containing aromatic heterocycle that forms together with two carbon atoms on a benzoquinone skeleton. This polymer is a material having charge-storing properties which, when used as an electrode active material, is capable of providing a high-performance battery possessing high capacity, high rate characteristics and high cycle characteristics.

24 Claims, 12 Drawing Sheets

(51) Int. Cl.
*C08G 65/48* (2006.01)
*C08G 65/38* (2006.01)
*H01M 10/0525* (2010.01)
*H01M 12/08* (2006.01)

(52) U.S. Cl.
CPC ............ H01M 4/604 (2013.01); H01M 4/606 (2013.01); *H01M 10/0525* (2013.01); *H01M 12/08* (2013.01); *Y02E 60/128* (2013.01)

(58) Field of Classification Search
CPC ...... H01M 12/08; H01M 4/604; C08G 65/38; C08G 65/48; Y02E 60/128; H01B 1/124
See application file for complete search history.

(56) References Cited

FOREIGN PATENT DOCUMENTS

| JP | 2008-147015 A | 6/2008 |
|----|---------------|--------|
| JP | 2009-217992 A | 9/2009 |
| JP | 2010-44882 A  | 2/2010 |
| JP | 2010-55923 A  | 3/2010 |
| JP | 2010-80343 A  | 4/2010 |
| JP | 2010-212152 A | 9/2010 |

OTHER PUBLICATIONS

Haupler et al., "Dithiophenedione-Containing Polymers for Battery Application," ACS Appl. Mater. Interfaces (2015), vol. 7, pp. 3473-3479.
Nakahara et al., "Rechargeable batteries with organic radical cathodes," Chemical Physics Letters (Jun. 27, 2002), vol. 359, pp. 351-354.
Nishide, H. and T. Suga, "Organic Radical Battery," The Electrochemical Society Interface (Winter 2005), vol. 14, pp. 32-36.
Uemachi et al., "Poly(1,4-phenylene-1,2,4-dithiazole-3',5'-yl): the new redox system for lithium secondary batteries," Electrochimica Acta (2001), vol. 46, pp. 2305-2312.
Visco et al., "A Novel Class of Organosulfur Electrodes for Energy Storage," J. Electrochem. Soc., (Mar. 1989), vol. 136, No. 3, pp. 661-664.
Vlad et al., "Hybrid supercapacitor-battery materials for fast electrochemical charge storage," Scientific Reports (Mar. 7, 2014), vol. 4, pp. 4315-4321.

* cited by examiner

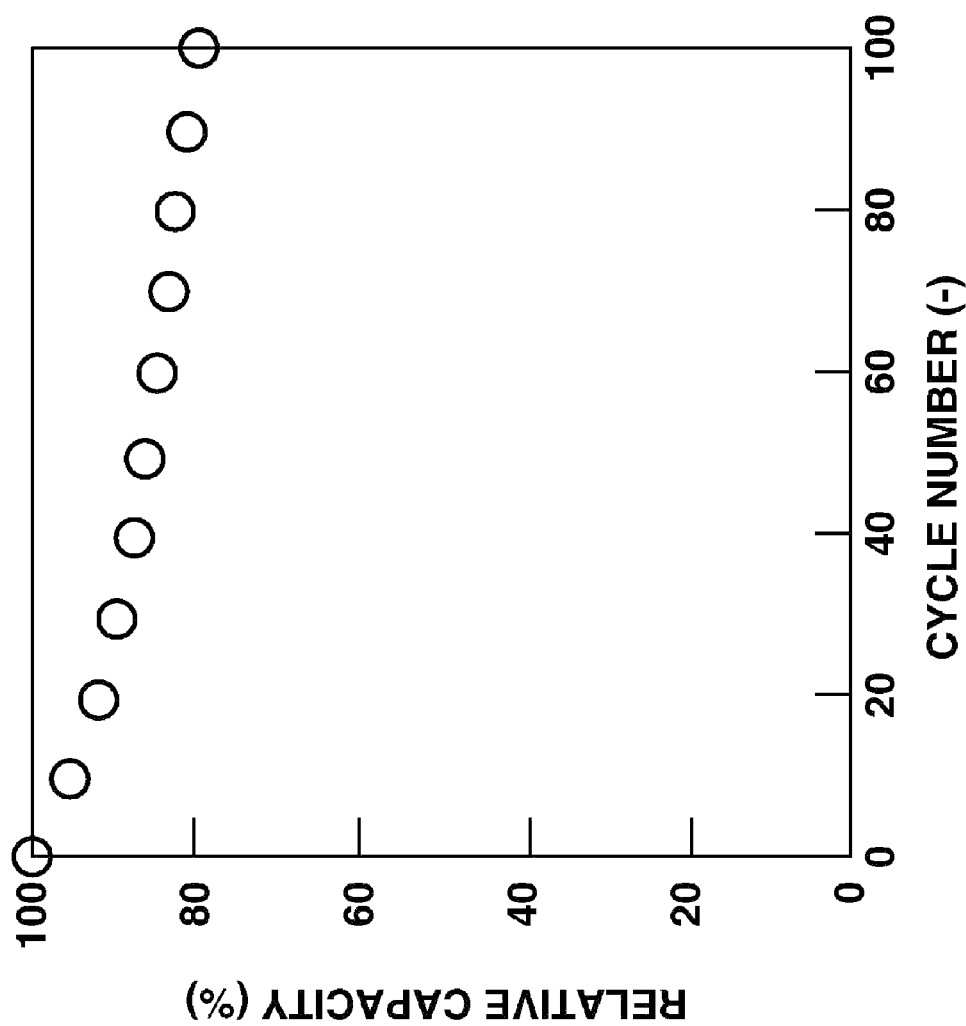

ION-CONDUCTIVE FUSED-RING QUINONE POLYMER, ELECTRODE ACTIVE MATERIAL AND SECONDARY BATTERY

CROSS-REFERENCE TO RELATED APPLICATION

This non-provisional application claims priority under 35 U.S.C. §119(a) on Patent Application Nos. 2015-179550 and 2016-040929 filed in Japan on Sep. 11, 2015 and Mar. 3, 2016, respectively, the entire contents of which are hereby incorporated by reference.

TECHNICAL FIELD

This invention relates to an ion-conductive fused-ring quinone polymer and to an electrode active material and a secondary battery made using the same.

BACKGROUND ART

Organic secondary batteries, which are rechargeable batteries that use an organic charge storage material as an electrode active material in the battery, are attracting considerable attention on account of such features as their high rate characteristics, high capacity retention with charge-discharge cycling, lightweight thin-film construction and potential physical flexibility. Nitroxyl radical-containing compounds are often used as the organic charge storage material (Chem. Phys. Lett. 359, 351-354 (2002); Electrochem. Soc. Interface 14, 32-36 (2005); JP-A 2002-117852), although the use of organosulfur polymers (J. Electrochem. Soc. 136, 661-664 (1989); Electrochimica Acta 46, 2305-2312 (2001)), quinone polymers (JP-A 2009-217992), quinoid materials (JP-A 2010-44882, JP-A 2010-55923, JP-A 2010-80343), dione materials (JP-A 2010-212152) and rubeanic acid-based materials (JP-A 2008-147015) has also been reported.

In recent years, it has been shown that, by using an organic charge storage material in the presence of an inorganic electrode active material, the capacity and voltage retention (collectively referred to below as the "rate characteristics") during high-speed charge and discharge of a lithium ion battery and the capacity retention (referred to below as the "cycle characteristics") in charge-discharge cycling can be improved (Scientific Reports 4, 4315-4321 (2014)), thus expanding applicable uses and methods for organic charge storage materials.

CITATION LIST

Patent Document 1: JP-A 2002-117852
Patent Document 2: JP-A 2009-217992
Patent Document 3: JP-A 2010-44882
Patent Document 4: JP-A 2010-55923
Patent Document 5: JP-A 2010-80343
Patent Document 6: JP-A 2010-212152
Patent Document 7: JP-A 2008-147015
Non-Patent Document 1: Chem. Phys. Lett. 359, 351-354 (2002)
Non-Patent Document 2: Electrochem. Soc. Interface 14, 32-36 (2005)
Non-Patent Document 3: J. Electrochem. Soc. 136, 661-664 (1989)
Non-Patent Document 4: Electrochimica Acta 46, 2305-2312 (2001)
Non-Patent Document 5: Scientific Reports 4, 4315-4321 (2014)
Non-Patent Document 6: ACS Appl. Mater. Interfaces, 7, 3473-3479 (2015)

SUMMARY OF THE INVENTION

However, batteries which use nitroxyl radical-containing charge storage materials as the electrode active material have a smaller charge storage capacity than batteries which use inorganic electrode active materials. When use has been made of organic charge storage materials having a high capacity, such as organosulfur polymers, drawbacks have included a low electrochemical stability and the inability to obtain sufficient cycle characteristics. A problem associated with the use of quinone-based charge storage materials as electrode active materials has been that increasing the proportion of electrode active material within the electrode significantly lowers the capacity per unit amount of the electrode active material (ACS Appl. Mater. Interfaces, 7, 3473-3479 (2015)). Other organic charge storage materials as well, when used alone as the electrode active material or when used together with an inorganic electrode active material, typically lack, for example, sufficient resistance to dissolution by the electrolyte solution, swellability that enables sufficient ion ingress and egress, ionic conductivity, and bindability with the inorganic electrode active material and current collector. Hence, satisfactory performance as a secondary battery has sometimes been unattainable.

It is therefore an object of this invention to provide a material having charge storing properties which, when used as an electrode active material, is capable of giving a high-performance battery that possesses high capacity, high rate characteristics and high cycle characteristics.

The inventors have found that ion-conductive fused-ring quinone polymers which include a polyether structure as the main chain and fused-ring quinone structures on side chains function as charge storage materials and that when such a charge storage material is used as an electrode active material, it resolves the above problems, providing a high-performance secondary battery having high capacity, high rate characteristics and high cycle characteristics.

Accordingly, in one aspect, the invention provides an ion-conductive fused-ring quinone polymer which includes recurring units of formula (1) and/or (2) below

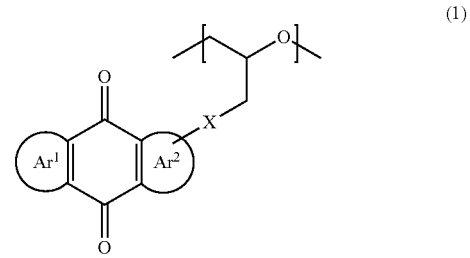

(1)

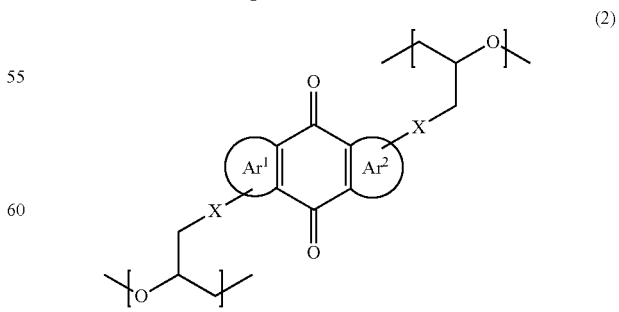

(2)

wherein each X is independently a single bond or a divalent group, and $A^1$ and $A^2$ are each independently an aromatic hydrocarbon ring or an oxygen atom or sulfur atom-containing aromatic heterocycle that forms together with two carbon atoms on a benzoquinone skeleton.

In a preferred embodiment of the ion-conductive fused-ring quinone polymer of the invention, the aromatic hydrocarbon ring is a benzene ring and the aromatic heterocycle is a thiophene ring. This ion-conductive fused-ring quinone polymer preferably includes recurring units of formula (1'), (1"), (2') or (2") below.

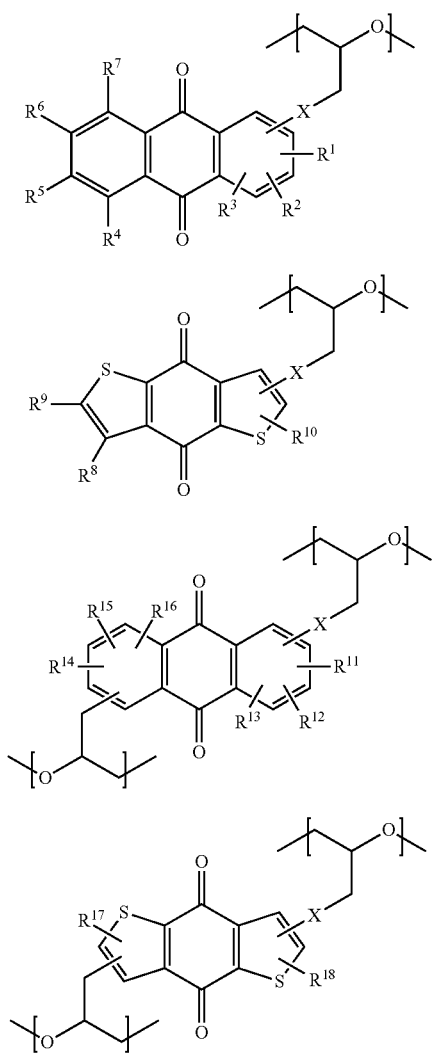

Here, X is as defined above; and $R^1$ to $R^{18}$ are each independently a hydrogen atom, a halogen atom, a hydroxyl group, a mercapto group, an amino group, a substituted or unsubstituted alkyl group of 1 to 12 carbon atoms, a substituted or unsubstituted alkenyl group of 2 to 12 carbon atoms, a substituted or unsubstituted alkynyl group of 2 to 12 carbon atoms, a substituted or unsubstituted aryl group of 6 to 12 carbon atoms, a substituted or unsubstituted heteroaryl group of 3 to 12 carbon atoms, a substituted or unsubstituted alkoxy group of 1 to 12 carbon atoms, a substituted or unsubstituted alkylthio group of 1 to 12 carbon atoms, a substituted or unsubstituted monoalkylamino group of 1 to 12 carbon atoms, a dialkylamino group in which each alkyl group is independently a substituted or unsubstituted alkyl group of 1 to 12 carbon atoms, or an alkylcarbonyl group of 2 to 12 carbon atoms.

The ion-conductive fused-ring quinone polymer of the invention may additionally include recurring units of formula (3) below

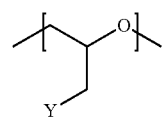

wherein Y is a halogen atom.

The ion-conductive fused-ring quinone polymer of the invention may additionally include recurring units of formula (4) or (4') below

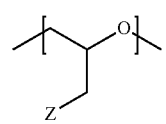

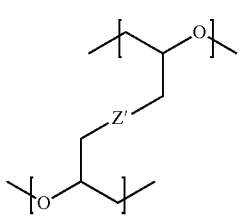

wherein Z is an alkoxy group of 1 to 12 carbon atoms, an alkyl group of 1 to 12 carbon atoms, an alkylthio group of 1 to 12 carbon atoms, an acyl group of 2 to 12 carbon atoms, an alkylamino group of 1 to 12 carbon atoms, a polyalkylene ether group, a polyalkyleneamine group or an aryl group; Z' is —O—(CH$_2$)$_a$—O—, —(CH$_2$)$_a$—, —S—(CH$_2$)$_a$—S—, —C(=O)—(CH$_2$)$_b$—C(=O)—, —NH—(CH$_2$)$_a$—NH—, —O—(R—O)$_c$—, —NH—(R—NH)$_c$— or a phenylene group; R is an alkylene group of 1 to 12 carbon atoms; the letter a is an integer from 1 to 12, the letter b is an integer from 1 to 10, and the letter c is an integer from 2 to 4.

In another aspect, the invention provides a charge storage material made of the foregoing ion-conductive fused-ring quinone polymer.

In yet another aspect, the invention provides an electrode active material which includes this charge storage material.

In still another aspect, the invention provides an electrode slurry containing this electrode active material and a solvent.

In a further aspect, the invention provides a thin-film containing this electrode active material.

In a still further aspect, the invention provides a thin-film produced from the foregoing electrode slurry.

In an additional aspect, the invention provides an electrode containing the foregoing electrode active material.

In another aspect, the invention provides an electrode containing either of the foregoing thin-films.

In yet another aspect, the invention provides a secondary battery containing either of the foregoing electrodes.

In a further aspect, the invention provides a lithium ion battery containing either of the foregoing electrodes.

In a still further aspect, the invention provides an air battery containing either of the foregoing electrodes.

Advantageous Effects of the Invention

Because the ion-conductive fused-ring quinone polymer of the invention has a fused-ring quinone skeleton that stores charge and is stabilized by a fused-ring structure where two anion radicals form, it has a high electrochemical stability and is thus useful as a charge storage material. Moreover, given that two-electron reduction proceeds, forming a stable dianion, when this polymer is used as an electrode active material in a battery, high stability and high capacity are both achieved.

Also, by having a main chain with a polyether structure, this polymer exhibits a high ionic conductivity, enabling the rapid replenishment of ions even under high-speed charge-discharge conditions, as a result of which the resulting secondary battery exhibits high rate characteristics. Moreover, overvoltage within the electrode can be thereby suppressed, providing also good cycle characteristics.

Owing to these effects, by using the ion-conductive fused-ring quinone polymer of the invention as an electrode active material, it is possible to manufacture secondary batteries having high rate characteristics, high capacity and high cycle characteristics. The ion-conductive fused-ring quinone polymer of the invention is particularly suitable as an electrode active material for lithium ion batteries. In ordinary secondary batteries, an inorganic material or a carbon material is used as the electrode active material. It is possible to replace either the positive electrode or the negative electrode in such batteries with an electrode containing the ion-conductive fused-ring quinone polymer of the invention, or to use the ion-conductive fused-ring quinone polymer of the invention in combination with an electrode active material that is made of an inorganic material or a carbon material.

BRIEF DESCRIPTION OF THE DIAGRAMS

FIG. 12 is a graph showing the charge-discharge cycle characteristics in the air secondary battery produced in Example 13.

DETAILED DESCRIPTION OF THE INVENTION

Figure 1:
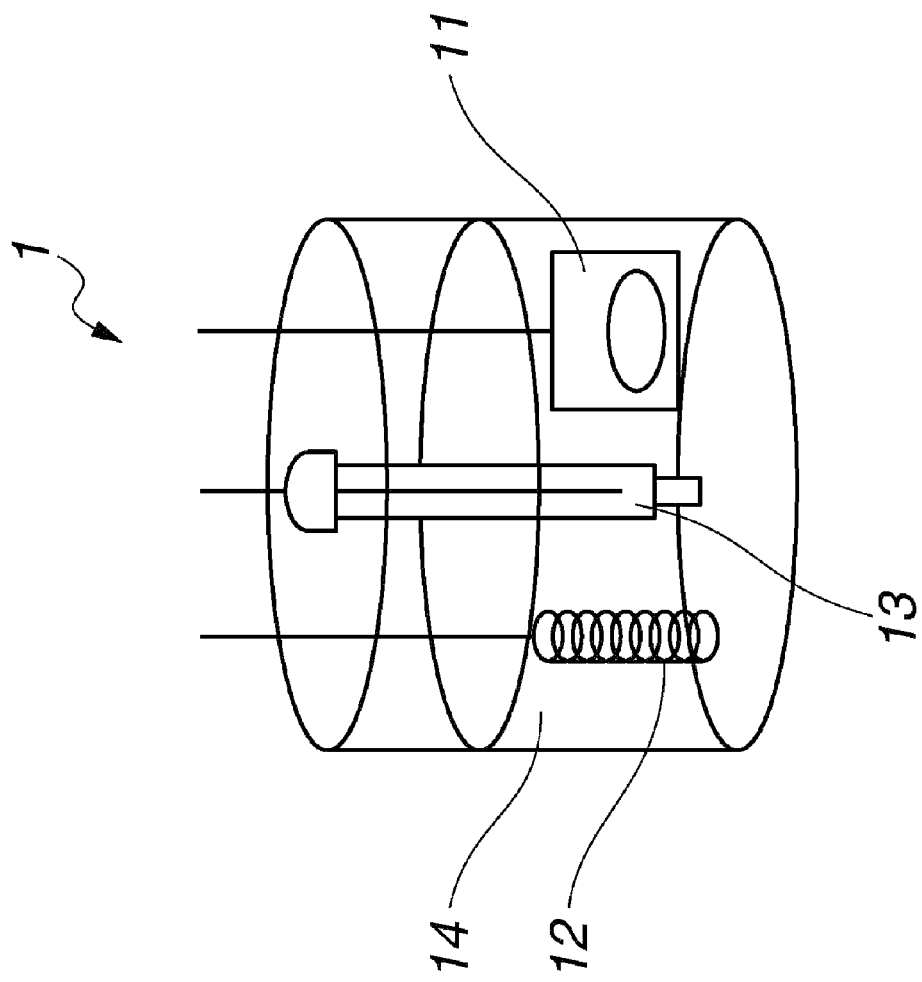
FIG. 1 is a schematic view of a beaker cell produced in the working examples of the invention.

The objects, features and advantages of the invention will become more apparent from the following detailed description, taken in conjunction with the foregoing diagrams.

Ion-Conductive Fused-Ring Quinone Polymer

The ion-conductive fused-ring quinone polymer of the invention includes recurring units of formula (1) and/or (2) below.

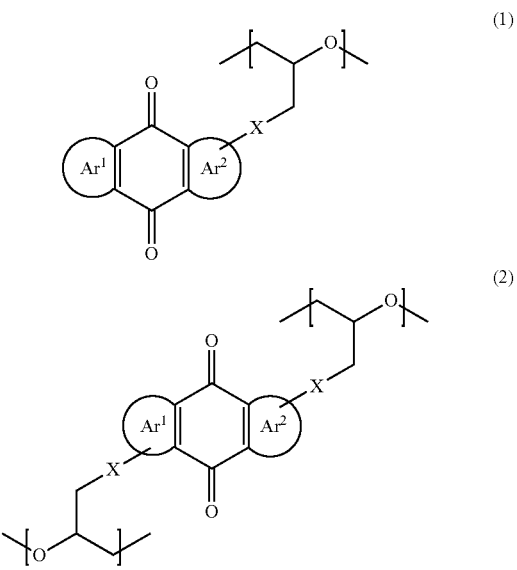

In these formulas, each X is independently a single bond or a divalent group. Preferred divalent groups include —O—, —S—, —NH—, —COO—, —O—CO—, —CO—NH— and —NH—CO—, with —O— being more preferred. $Ar^1$ and $Ar^2$ are each independently an aromatic hydrocarbon ring or an oxygen atom or sulfur atom-containing aromatic heterocycle that forms together with two carbon atoms on a benzoquinone skeleton.

The aromatic hydrocarbon ring is preferably a benzene ring. Preferred examples of the aromatic heterocycle include a thiophene ring and a furan ring. Of these, a benzene ring or a thiophene ring is especially preferred.

The recurring units of formula (1) are preferably ones of formula (1') or (1") below, and the recurring units of formula (2) are preferably ones of formula (2') or (2") below.

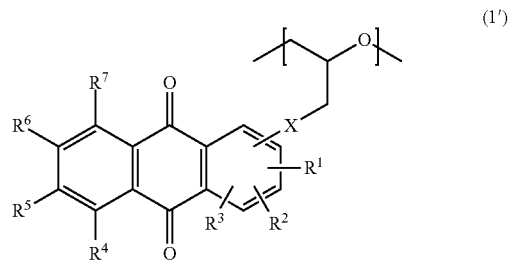

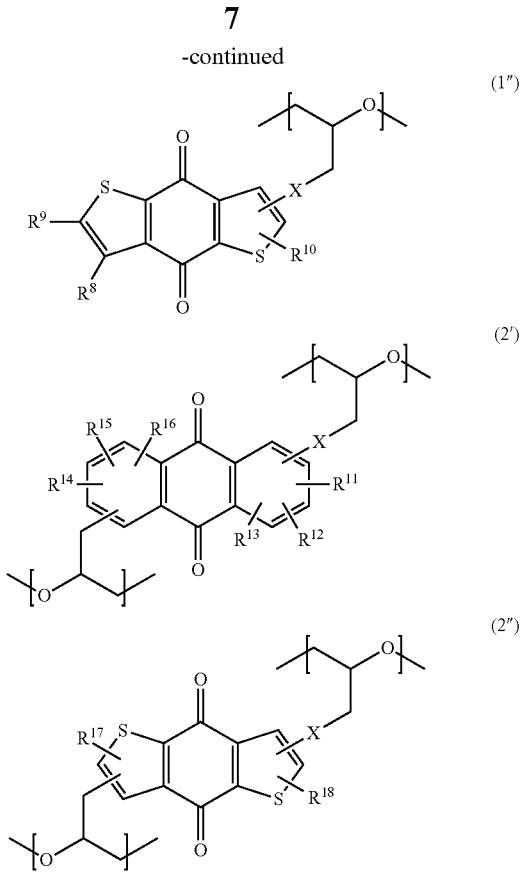

In these formulas, X is as defined above. $R^1$ to $R^{18}$ are each independently a hydrogen atom, a halogen atom, a hydroxyl group, a mercapto group, an amino group, a substituted or unsubstituted alkyl group of 1 to 12 carbon atoms, a substituted or unsubstituted alkenyl group of 2 to 12 carbon atoms, a substituted or unsubstituted alkynyl group of 2 to 12 carbon atoms, a substituted or unsubstituted aryl group of 6 to 12 carbon atoms, a substituted or unsubstituted heteroaryl group of 3 to 12 carbon atoms, a substituted or unsubstituted alkoxy group of 1 to 12 carbon atoms, a substituted or unsubstituted alkylthio group of 1 to 12 carbon atoms, a substituted or unsubstituted monoalkylamino group of 1 to 12 carbon atoms, a dialkylamino group in which each alkyl group is independently a substituted or unsubstituted alkyl group of 1 to 12 carbon atoms, or an alkylcarbonyl group of 2 to 12 carbon atoms.

The halogen atom is exemplified by a fluorine atom, a chlorine atom, a bromine atom and an iodine atom.

The alkyl group may be linear, branched or cyclic. Illustrative examples include methyl, ethyl, n-propyl, i-propyl, c-propyl, n-butyl, i-butyl, s-butyl, t-butyl, c-butyl, 1-methyl-c-propyl, 2-methyl-c-propyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, c-pentyl, 1-methyl-c-butyl, 2-methyl-c-butyl, 3-methyl-c-butyl, 1,2-dimethyl-c-propyl, 2,2-dimethyl-c-propyl, 2,3-dimethyl-c-propyl, 1-ethyl-c-propyl, 2-ethyl-c-propyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, c-hexyl, 1-methyl-c-pentyl, 2-methyl-c-pentyl, 3-methyl-c-pentyl, 1-ethyl-c-butyl, 2-ethyl-c-butyl, 3-ethyl-c-butyl, 1,2-dimethyl-c-butyl, 1,3-dimethyl-c-butyl, 2,2-dimethyl-c-butyl, 2,3-dimethyl-c-butyl, 2,4-dimethyl-c-butyl, 3,3-dimethyl-c-butyl, 1-n-propyl-c-propyl, 2-n-propyl-c-propyl, 1-i-propyl-c-propyl, 2-i-propyl-c-propyl, 1,2,2-trimethyl-c-propyl, 1,2,3-trimethyl-c-propyl, 2,2,3-trimethyl-c-propyl, 1-ethyl-2-methyl-c-propyl, 2-ethyl-1-methyl-c-propyl, 2-ethyl-2-methyl-c-propyl, 2-ethyl-3-methyl-c-propyl, n-heptyl, n-octyl, n-nonyl, n-decyl, n-undecyl and n-dodecyl groups.

The alkenyl group may be linear, branched or cyclic. Illustrative examples include ethenyl, 1-propenyl, 2-propenyl, 1-methyl-1-ethenyl, 1-n-butenyl, 2-n-butenyl, 3-n-butenyl, 2-methyl-1-propenyl, 2-methyl-2-propenyl, 1-ethylethenyl, 1-methyl-1-propenyl, 1-methyl-2-propenyl, 1-n-pentenyl, 2-n-pentenyl, 3-n-pentenyl, 4-n-pentenyl, 1-n-propylethenyl, 1-methyl-1-n-butenyl, 1-methyl-2-n-butenyl, 1-methyl-3-n-butenyl, 2-ethyl-2-propenyl, 2-methyl-1-n-butenyl, 2-methyl-2-n-butenyl, 2-methyl-3-n-butenyl, 3-methyl-1-n-butenyl, 3-methyl-2-n-butenyl, 3-methyl-3-n-butenyl, 1,1-dimethyl-2-propenyl, 1-i-propylethenyl, 1-2-dimethyl-1-n-propenyl, 1,2-dimethyl-2-n-propenyl, 1-c-pentenyl, 2-c-pentenyl, 3-c-pentenyl, 1-n-hexenyl, 2-n-hexenyl, 3-n-hexenyl, 4-n-hexenyl, 5-n-hexenyl, 1-methyl-1-n-pentenyl, 1-methyl-2-n-pentenyl, 1-methyl-3-n-pentenyl, 1-methyl-4-n-pentenyl, 1-n-butylethenyl, 2-methyl-1-n-pentenyl, 2-methyl-2-n-pentenyl, 2-methyl-3-n-pentenyl, 2-methyl-4-n-pentenyl, 2-n-propyl-2-n-propenyl, 3-methyl-1-n-pentenyl, 3-methyl-2-n-pentenyl, 3-methyl-3-n-pentenyl, 3-methyl-4-n-pentenyl, 3-ethyl-3-n-butenyl, 4-methyl-1-n-pentenyl, 4-methyl-2-n-pentenyl, 4-methyl-3-n-pentenyl, 4-methyl-4-n-pentenyl, 1,1-dimethyl-2-n-butenyl, 1,1-dimethyl-3-n-butenyl, 1,2-dimethyl-1-n-butenyl, 1,2-dimethyl-2-n-butenyl, 1,2-dimethyl-3-n-butenyl, 1-methyl-2-ethyl-2-n-propenyl, 1-s-butylethenyl, 1,3-dimethyl-1-n-butenyl, 1,3-dimethyl-2-n-butenyl, 1,3-dimethyl-3-n-butenyl, 1-i-butylethenyl, 2,2-dimethyl-3-n-butenyl, 2,3-dimethyl-1-n-butenyl, 2,3-dimethyl-2-n-butenyl, 2,3-dimethyl-3-n-butenyl, 2-i-propyl-2-n-propenyl, 3,3-dimethyl-1-n-butenyl, 1-ethyl-1-n-butenyl, 1-ethyl-2-n-butenyl, 1-ethyl-3-n-butenyl, 1-n-propyl-1-n-propenyl, 1-n-propyl-2-n-propenyl, 2-ethyl-1-n-butenyl, 2-ethyl-2-n-butenyl, 2-ethyl-3-n-butenyl, 1,1,2-trimethyl-2-propenyl, 1-t-butylethenyl, 1-methyl-1-ethyl-2-propenyl, 1-ethyl-2-methyl-1-n-propenyl, 1-ethyl-2-methyl-2-propenyl, 1-i-propyl-1-propenyl, 1-i-propyl-2-n-propenyl, 1-methyl-2-c-pentenyl, 1-methyl-3-c-pentenyl, 2-methyl-1-c-pentenyl, 2-methyl-2-c-pentenyl, 2-methyl-3-c-pentenyl, 2-methyl-4-c-pentenyl, 2-methyl-5-c-pentenyl, 2-methylene-c-pentyl, 3-methyl-1-c-pentenyl, 3-methyl-2-c-pentenyl, 3-methyl-3-c-pentenyl, 3-methyl-4-c-pentenyl, 3-methyl-5-c-pentenyl, 3-methylene-c-pentyl, 1-c-hexenyl, 2-c-hexenyl and 3-c-hexenyl groups.

The alkynyl group may be linear, branched or cyclic. Illustrative examples include ethynyl, 1-propynyl, 2-propynyl, 1-n-butynyl, 2-n-butynyl, 3-n-butynyl, 1-methyl-2-propynyl, 1-n-pentynyl, 2-n-pentynyl, 3-n-pentynyl, 4-n-pentynyl, 1-methyl-2-n-butynyl, 1-methyl-3-n-butynyl, 2-methyl-3-n-butynyl, 3-methyl-1-n-butynyl, 1,1-dimethyl-2-propynyl, 2-ethyl-2-propynyl, 1-n-hexynyl, 2-n-hexynyl, 3-n-hexynyl, 4-n-hexynyl, 5-n-hexynyl, 1-methyl-2-pentynyl, 1-methyl-3-n-pentynyl, 1-methyl-4-n-pentynyl, 2-methyl-3-n-pentynyl, 2-methyl-4-n-pentynyl, 3-methyl-1-n-pentynyl, 3-methyl-4-n-pentynyl, 4-methyl-1-n-pentynyl, 4-methyl-2-n-pentynyl, 1,1-dimethyl-2-n-butynyl, 1,1-dimethyl-3-n-butynyl, 1,2-dimethyl-3-n-butynyl, 2,2-dimethyl-3-n-butynyl, 3,3-dimethyl-1-butynyl, 1-ethyl-2-butynyl, 1-ethyl-3-butynyl, 1-n-propyl-2-propynyl, 2-ethyl-3-n-butynyl, 1-methyl-1-ethyl-2-propynyl and 1-i-propyl-2-propynyl groups.

Illustrative examples of the aryl group include phenyl, α-naphthyl, β-naphthyl, o-biphenyl, m-biphenyl, p-biphenyl, 1-anthryl, 2-anthryl, 9-anthryl, 1-phenanthryl, 2-phenanthryl, 3-phenanthryl, 4-phenanthryl and 9-phenanthryl groups.

Illustrative examples of the heteroaryl group include 2-furyl, 3-furyl, 2-thienyl, 3-thienyl, 1-pyrrolyl, 2-pyrrolyl, 3-pyrrolyl, 1-imidazolyl, 2-imidazolyl and 4-imidazolyl groups.

The alkoxy group may be linear, branched or cyclic. Illustrative examples include methoxy, ethoxy, n-propoxy, i-propoxy, c-propoxy, n-butoxy, i-butoxy, s-butoxy, t-butoxy, c-butoxy, n-pentyloxy, 1-methyl-n-butoxy, 2-methyl-n-butoxy, 3-methyl-n-butoxy, 1,1-dimethyl-n-propoxy, c-pentyloxy, 2-methyl-c-butoxy, n-hexyloxy, 1-methyl-n-pentyloxy, 2-methyl-n-pentyloxy, 1,1-dimethyl-n-butoxy, 1-ethyl-n-butoxy, 1,1,2-trimethyl-n-propoxy, c-hexyloxy, 1-methyl-c-pentyloxy, 1-ethyl-c-butoxy, 1,2-dimethyl-c-butoxy, n-heptyloxy, n-octyloxy, n-nonyloxy, n-decyloxy, n-undecyloxy and n-dodecyloxy groups.

The alkylthio group may be linear, branched or cyclic. Illustrative examples include methylthio, ethylthio, n-propylthio, i-propylthio, n-butylthio, s-butylthio, t-butylthio, n-pentylthio, 1-methylbutylthio, 2-methyl-n-butylthio, 3-methyl-n-butylthio, 1,1-dimethylpropylthio, 2,2-dimethylpropylthio, n-hexylthio, 1-methyl-n-pentylthio, 2-methyl-n-pentylthio, 1,1-dimethyl-n-butylthio, 1-ethyl-n-butylthio, 1,1,2-trimethylpropylthio, n-heptylthio, n-octylthio, 2-ethyl-n-hexylthio, n-nonylthio, n-decylthio, n-undecylthio and n-dodecylthio groups.

The monoalkylamino group may be linear, branched or cyclic. Illustrative examples include methylamino, ethylamino, n-propylamino, i-propylamino, c-propylamino, n-butylamino, i-butylamino, s-butylamino, t-butylamino, c-butylamino, 1-methyl-c-propylamino, 2-methyl-c-propylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, c-pentylamino, 1-methyl-c-butylamino, 2-methyl-c-butylamino, 3-methyl-c-butylamino, 1,2-dimethyl-c-propylamino, 2,3-dimethyl-c-propylamino, 1-ethyl-c-propylamino, 2-ethyl-c-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino, 1-ethyl-2-methyl-n-propylamino, c-hexylamino, 1-methyl-c-pentylamino, 2-methyl-c-pentylamino, 3-methyl-c-pentylamino, 1-ethyl-c-butylamino, 2-ethyl-c-butylamino, 3-ethyl-c-butylamino, 1,2-dimethyl-c-butylamino, 1,3-dimethyl-c-butylamino, 2,2-dimethyl-c-butylamino, 2,3-dimethyl-c-butylamino, 2,4-dimethyl-c-butylamino, 3,3-dimethyl-c-butylamino, 1-n-propyl-c-propylamino, 2-n-propyl-c-propylamino, 1-i-propyl-c-propylamino, 2-i-propyl-c-propylamino, 1,2,2-trimethyl-c-propylamino, 1,2,3-trimethyl-c-propylamino, 2,2,3-trimethyl-c-propylamino, 1-ethyl-2-methyl-c-propylamino, 2-ethyl-1-methyl-c-propylamino, 2-ethyl-2-methyl-c-propylamino and 2-ethyl-3-methyl-c-propylamino groups.

The dialkylamino group may be linear, branched or cyclic. Illustrative examples include dimethylamino, diethylamino, di-n-propylamino, di-i-propylamino, di-c-propylamino, di-n-butylamino, di-i-butylamino, di-s-butylamino, di-t-butylamino, di-c-butylamino, di(1-methyl-c-propyl)amino, di(2-methyl-c-propyl)amino, di-n-pentylamino, di(1-methyl-n-butyl)amino, di(2-methyl-n-butyl)amino, di(3-methyl-n-butyl)amino, di(1,1-dimethyl-n-propyl)amino, di(1,2-dimethyl-n-propyl)amino, di(2,2-dimethyl-n-propyl)amino, di(1-ethyl-n-propyl)amino, di-c-pentylamino, di(1-methyl-c-butyl)amino, di(2-methyl-c-butyl)amino, di(3-methyl-c-butyl)amino, di(1,2-dimethyl-c-propyl)amino, di(2,3-dimethyl-c-propyl)amino, di(1-ethyl-c-propyl)amino, di(2-ethyl-c-propyl)amino, di-n-hexylamino, di(1-methyl-n-pentyl)amino, di(2-methyl-n-pentyl)amino, di(3-methyl-n-pentyl)amino, di(4-methyl-n-pentyl)amino, di(1,1-dimethyl-n-butyl)amino, di(1,2-dimethyl-n-butyl)amino, di(1,3-dimethyl-n-butyl)amino, di(2,2-dimethyl-n-butyl)amino, di(2,3-dimethyl-n-butyl)amino, di(3,3-dimethyl-n-butyl)amino, di(1-ethyl-n-butyl)amino, di(2-ethyl-n-butyl)amino, di(1,1,2-trimethyl-n-propyl)amino, di(1,2,2-trimethyl-n-propyl)amino, di(1-ethyl-1-methyl-n-propyl)amino, di(1-ethyl-2-methyl-n-propyl)amino, di-c-hexylamino, di(1-methyl-c-pentyl)amino, di(2-methyl-c-pentyl)amino, di(3-methyl-c-pentyl)amino, di(1-ethyl-c-butyl)amino, di(2-ethyl-c-butyl)amino, di(3-ethyl-c-butyl)amino, di(1,2-dimethyl-c-butyl)amino, di(1,3-dimethyl-c-butyl)amino, di(2,2-dimethyl-c-butyl)amino, di(2,3-dimethyl-c-butyl)amino, di(2,4-dimethyl-c-butyl)amino, di(3,3-dimethyl-c-butyl)amino, di(1-n-propyl-c-propyl)amino, di(2-n-propyl-c-propyl)amino, di(1-i-propyl-c-propyl)amino, di(2-i-propyl-c-propyl)amino, di(1,2,2-trimethyl-c-propyl)amino, di(1,2,3-trimethyl-c-propyl)amino, di(2,2,3-trimethyl-c-propyl)amino, di(1-ethyl-2-methyl-c-propyl)amino, di(2-ethyl-1-methyl-c-propyl)amino, di(2-ethyl-2-methyl-c-propyl)amino and di(2-ethyl-3-methyl-c-propyl)amino groups.

Illustrative examples of the alkylcarbonyl group include methylcarbonyl, ethylcarbonyl, n-propylcarbonyl, i-propylcarbonyl, c-propylcarbonyl, n-butylcarbonyl, i-butylcarbonyl, s-butylcarbonyl, t-butylcarbonyl, c-butylcarbonyl, 1-methyl-c-propylcarbonyl, 2-methyl-c-propylcarbonyl, n-pentylcarbonyl, 1-methyl-n-butylcarbonyl, 2-methyl-n-butylcarbonyl, 3-methyl-n-butylcarbonyl, 1,1-dimethyl-n-propylcarbonyl, 1,2-dimethyl-n-propylcarbonyl, 2,2-dimethyl-n-propylcarbonyl, 1-ethyl-n-propylcarbonyl, c-pentylcarbonyl, 1-methyl-c-butylcarbonyl, 2-methyl-c-butylcarbonyl, 3-methyl-c-butylcarbonyl, 1,2-dimethyl-c-propylcarbonyl, 2,3-dimethyl-c-propylcarbonyl, 1-ethyl-c-propylcarbonyl, 2-ethyl-c-propylcarbonyl, n-hexylcarbonyl, 1-methyl-n-pentylcarbonyl, 2-methyl-n-pentylcarbonyl, 3-methyl-n-pentylcarbonyl, 4-methyl-n-pentylcarbonyl, 1,1-dimethyl-n-butylcarbonyl, 1,2-dimethyl-n-butylcarbonyl, 1,3-dimethyl-n-butylcarbonyl, 2,2-dimethyl-n-butylcarbonyl, 2,3-dimethyl-n-butylcarbonyl, 3,3-dimethyl-n-butylcarbonyl, 1-ethyl-n-butylcarbonyl, 2-ethyl-n-butylcarbonyl, 1,1,2-trimethyl-n-propylcarbonyl, 1,2,2-trimethyl-n-propylcarbonyl, 1-ethyl-1-methyl-n-propylcarbonyl, 1-ethyl-2-methyl-n-propylcarbonyl, c-hexylcarbonyl, 1-methyl-c-pentylcarbonyl, 2-methyl-c-pentylcarbonyl, 3-methyl-c-pentylcarbonyl, 1-ethyl-c-butylcarbonyl, 2-ethyl-c-butylcarbonyl, 3-ethyl-c-butylcarbonyl, 1,2-dimethyl-c-butylcarbonyl, 1,3-dimethyl-c-butylcarbonyl, 2,2-dimethyl-c-butylcarbonyl, 2,3-dimethyl-c-butylcarbonyl, 2,4-dimethyl-c-butylcarbonyl, 3,3-dimethyl-c-butylcarbonyl, 1-n-propyl-c-propylcarbonyl, 2-n-propyl-c-propylcarbonyl, 1-i-propyl-c-propylcarbonyl, 2-i-propyl-c-propylcarbonyl, 1,2,2-trimethyl-c-propylcarbonyl, 1,2,3-trimethyl-c-propylcarbonyl, 2,2,3-trimethyl-c-propylcarbonyl, 1-ethyl-2- methyl-c-propylcarbonyl, 2-ethyl-1-methyl-c-propylcarbonyl, 2-ethyl-2-methyl-c-propylcarbonyl and 2-ethyl-3-methyl-c-propylcarbonyl groups.

Of these, to increase the capacity and electrical conductivity, $R^1$ to $R^{18}$ are preferably each independently a hydrogen atom, chlorine atom, methyl group, ethyl group, n-propyl group, i-propyl group, n-butyl group, s-butyl group, t-butyl group, n-pentyl group, 1-methylbutyl group, 2-methylbutyl group, 3-methylbutyl group, 1,1-dimethylpropyl group, 2,2-dimethylpropyl group, n-hexyl group, 1-methylpentyl group, 2-methylpentyl group, 1,1-dimethylbutyl group, 1-ethylbutyl group or 1,1,2-trimethylpropyl group; more preferably a hydrogen atom, chlorine atom, methyl group, ethyl group, n-propyl group, i-propyl group, n-butyl group, s-butyl group or t-butyl group; and most preferably a hydrogen atom.

Some or all of the hydrogen atoms that bond to the carbon atoms in the above groups may be substituted with substituents. Such substituents are exemplified by halogen atoms such as fluorine, chlorine, bromine and iodine atoms, hydroxyl groups, mercapto groups, amino groups, alkoxy groups of 1 to 11 carbon atoms, haloalkoxy groups of 1 to 11 carbon atoms, alkylthio groups of 1 to 11 carbon atoms, monoalkylamino groups of 1 to 11 carbon atoms, dialkylamino groups in which each alkyl group is independently an alkyl group of 1 to 11 carbons, glycidoxy groups, alkylcarbonyl groups of 2 to 11 carbon atoms, alkenylcarbonyl groups of 3 to 11 carbon atoms, alkynylcarbonyl groups of 3 to 11 carbon atoms, alkylcarbonyloxy groups of 2 to 11 carbon atoms, alkenylcarbonyloxy groups of 3 to 11 carbon atoms, alkynylcarbonyloxy groups of 3 to 11 carbon atoms, aryl groups of 6 to 11 carbon atoms, halogenated aryl groups of 6 to 11 carbon atoms, heteroaryl groups of 3 to 11 carbon atoms, and halogenated heteroaryl groups of 3 to 11 carbon atoms. When such substituents are present, the upper limit in the total number of carbon atoms in each of $R^1$ to $R^{18}$ is 12.

Illustrative examples of the alkoxy group of 1 to 11 carbon atoms include methoxy, ethoxy, n-propoxy, i-propoxy, c-propoxy, n-butoxy, i-butoxy, s-butoxy, t-butoxy, c-butoxy, 1-methyl-c-propoxy, 2-methyl-c-propoxy, n-pentyloxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, c-pentyloxy, 1-methyl-c-butoxy, 2-methyl-c-butoxy, 3-methyl-c-butoxy, 1,2-dimethyl-c-propoxy, 2,3-dimethyl-c-propoxy, 1-ethyl-c-propoxy, 2-ethyl-c-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy, 1-ethyl-2-methyl-n-propoxy, c-hexyloxy, 1-methyl-c-pentyloxy, 2-methyl-c-pentyloxy, 3-methyl-c-pentyloxy, 1-ethyl-c-butoxy, 2-ethyl-c-butoxy, 3-ethyl-c-butoxy, 1,2-dimethyl-c-butoxy, 1,3-dimethyl-c-butoxy, 2,2-dimethyl-c-butoxy, 2,3-dimethyl-c-butoxy, 2,4-dimethyl-c-butoxy, 3,3-dimethyl-c-butoxy, 1-n-propyl-c-propoxy, 2-n-propyl-c-propoxy, 1-i-propyl-c-propoxy, 2-i-propyl-c-propoxy, 1,2,2-trimethyl-c-propoxy, 1,2,3-trimethyl-c-propoxy, 2,2,3-trimethyl-c-propoxy, 1-ethyl-2-methyl-c-propoxy, 2-ethyl-1-methyl-c-propoxy, 2-ethyl-2-methyl-c-propoxy, 2-ethyl-3-methyl-c-propoxy, n-heptyloxy, n-octyloxy, n-nonyloxy, n-decyloxy and n-undecyloxy groups.

Illustrative examples of the haloalkoxy group of 1 to 11 carbons include difluoromethoxy, trifluoromethoxy, bromodifluoromethoxy, 2-chloroethoxy, 2-bromoethoxy, 1,1-difluoroethoxy, 2,2,2-trifluoroethoxy, 1,1,2,2-tetrafluoroethoxy, 2-chloro-1,1,2-trifluoroethoxy, pentafluoroethoxy, 3-bromopropoxy, 2,2,3,3-tetrafluoropropoxy, 1,1,2,3,3,3-hexafluoropropoxy, 1,1,1,3,3,3-hexafluoropropan-2-yloxy, 3-bromo-2-methylpropoxy, 4-bromobutoxy and perfluoropentyloxy groups.

Illustrative examples of the alkylthio group of 1 to 11 carbon atoms include methylthio, ethylthio, n-propylthio, i-propylthio, c-propylthio, n-butylthio, i-butylthio, s-butylthio, t-butylthio, c-butylthio, 1-methyl-c-propylthio, 2-methyl-c-propylthio, n-pentylthio, 1-methyl-n-butylthio, 2-methyl-n-butylthio, 3-methyl-n-butylthio, 1,1-dimethyl-n-propylthio, 1,2-dimethyl-n-propylthio, 2,2-dimethyl-n-propylthio, 1-ethyl-n-propylthio, c-pentylthio, 1-methyl-c-butylthio, 2-methyl-c-butylthio, 3-methyl-c-butylthio, 1,2-dimethyl-c-propylthio, 2,3-dimethyl-c-propylthio, 1-ethyl-c-propylthio, 2-ethyl-c-propylthio, n-hexylthio, 1-methyl-n-pentylthio, 2-methyl-n-pentylthio, 3-methyl-n-pentylthio, 4-methyl-n-pentylthio, 1,1-dimethyl-n-butylthio, 1,2-dimethyl-n-butylthio, 1,3-dimethyl-n-butylthio, 2,2-dimethyl-n-butylthio, 2,3-dimethyl-n-butylthio, 3,3-dimethyl-n-butylthio, 1-ethyl-n-butylthio, 2-ethyl-n-butylthio, 1,1,2-trimethyl-n-propylthio, 1,2,2-trimethyl-n-propylthio, 1-ethyl-1-methyl-n-propylthio, 1-ethyl-2-methyl-n-propylthio, c-hexylthio, 1-methyl-c-pentylthio, 2-methyl-c-pentylthio, 3-methyl-c-pentylthio, 1-ethyl-c-butylthio, 2-ethyl-c-butylthio, 3-ethyl-c-butylthio, 1,2-dimethyl-c-butylthio, 1,3-dimethyl-c-butylthio, 2,2-dimethyl-c-butylthio, 2,3-dimethyl-c-butylthio, 2,4-dimethyl-c-butylthio, 3,3-dimethyl-c-butylthio, 1-n-propyl-c-propylthio, 2-n-propyl-c-propylthio, 1-i-propyl-c-propylthio, 2-i-propyl-c-propylthio, 1,2,2-trimethyl-c-propylthio, 1,2,3-trimethyl-c-propylthio, 2,2,3-trimethyl-c-propylthio, 1-ethyl-2-methyl-c-propylthio, 2-ethyl-1-methyl-c-propylthio, 2-ethyl-2-methyl-c-propylthio, 2-ethyl-3-methyl-c-propylthio, n-heptylthio, n-octylthio, n-nonylthio, n-decylthio and n-undecylthio groups.

Illustrative examples of the monoalkylamino group of 1 to 11 carbon atoms include methylamino, ethylamino, n-propylamino, i-propylamino, c-propylamino, n-butylamino, i-butylamino, s-butylamino, t-butylamino, c-butylamino, 1-methyl-c-propylamino, 2-methyl-c-propylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, c-pentylamino, 1-methyl-c-butylamino, 2-methyl-c-butylamino, 3-methyl-c-butylamino, 1,2-dimethyl-c-propylamino, 2,3-dimethyl-c-propylamino, 1-ethyl-c-propylamino, 2-ethyl-c-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino, 1-ethyl-2-methyl-n-propylamino, c-hexylamino, 1-methyl-c-pentylamino, 2-methyl-c-pentylamino, 3-methyl-c-pentylamino, 1-ethyl-c-butylamino, 2-ethyl-c-butylamino, 3-ethyl-c-butylamino, 1,2-dimethyl-c-butylamino, 1,3-dimethyl-c-butylamino, 2,2-dimethyl-c-butylamino, 2,3-dimethyl-c-butylamino, 2,4-dimethyl-c-butylamino, 3,3-dimethyl-c-butylamino, 1-n-propyl-c-propylamino, 2-n-propyl-c-propylamino, 1-i-propyl-c-propylamino, 2-i-propyl-c-propylamino, 1,2,2-trimethyl-c-propylamino, 1,2,3-trimethyl-c-propylamino, 2,2,3- trimethyl-c-propylamino, 1-ethyl-2-methyl-c-propylamino, 2-ethyl-1-methyl-c-propylamino, 2-ethyl-2-methyl-c-propylamino and 2-ethyl-3-methyl-c-propylamino groups.

Illustrative examples of the dialkylamino group in which each alkyl group is independently an alkyl group of 1 to 11 carbons include dimethylamino, diethylamino, di-n-propylamino, di-i-propylamino, di-c-propylamino, di-n-butylamino, di-i-butylamino, di-s-butylamino, di-t-butylamino, di-c-butylamino, di(1-methyl-c-propyl)amino, di(2-methyl-c-propyl)amino, di-n-pentylamino, di(1-methyl-n-butyl)amino, di(2-methyl-n-butyl)amino, di(3-methyl-n-butyl)amino, di(1,1-dimethyl-n-propyl)amino, di(1,2-dimethyl-n-propyl)amino, di(2,2-dimethyl-n-propyl)amino, di(1-ethyl-n-propyl)amino, di-c-pentylamino, di(1-methyl-c-butyl)amino, di(2-methyl-c-butyl)amino, di(3-methyl-c-butyl)amino, di(1,2-dimethyl-c-propyl)amino, di(2,3-dimethyl-c-propyl)amino, di(1-ethyl-c-propyl)amino, di(2-ethyl-c-propyl)amino, di-n-hexylamino, di(1-methyl-n-pentyl)amino, di(2-methyl-n-pentyl)amino, di(3-methyl-n-pentyl)amino, di(4-methyl-n-pentyl)amino, di(1,1-dimethyl-n-butyl)amino, di(1,2-dimethyl-n-butyl)amino, di(1,3-dimethyl-n-butyl)amino, di(2,2-dimethyl-n-butyl)amino, di(2,3-dimethyl-n-butyl)amino, di(3,3-dimethyl-n-butyl)amino, di(1-ethyl-n-butyl)amino, di(2-ethyl-n-butyl)amino, di(1,1,2-trimethyl-n-propyl)amino, di(1,2,2-trimethyl-n-propyl)amino, di(1-ethyl-1-methyl-n-propyl)amino, di(1-ethyl-2-methyl-n-propyl)amino, di-c-hexylamino, di(1-methyl-c-pentyl)amino, di(2-methyl-c-pentyl)amino, di(3-methyl-c-pentyl)amino, di(1-ethyl-c-butyl)amino, di(2-ethyl-c-butyl)amino, di-(3-ethyl-c-butyl)amino, di(1,2-dimethyl-c-butyl)amino, di(1,3-dimethyl-c-butyl)amino, di(2,2-dimethyl-c-butyl)amino, di(2,3-dimethyl-c-butyl)amino, di(2,4-dimethyl-c-butyl)amino, di(3,3-dimethyl-c-butyl)amino, di(1-n-propyl-c-propyl)amino, di(2-n-propyl-c-propyl)amino, di(1-i-propyl-c-propyl)amino, di(2-i-propyl-c-propyl)amino, di(1,2,2-trimethyl-c-propyl)amino, di(1,2,3-trimethyl-c-propyl)amino, di(2,2,3-trimethyl-c-propyl)amino, di(1-ethyl-2-methyl-c-propyl)amino, di(2-ethyl-1-methyl-c-propyl)amino, di(2-ethyl-2-methyl-c-propyl)amino and di(2-ethyl-3-methyl-c-propyl)amino groups.

Illustrative examples of the alkylcarbonyl group of 2 to 11 carbon atoms include methylcarbonyl, ethylcarbonyl, n-propylcarbonyl, i-propylcarbonyl, c-propylcarbonyl, n-butylcarbonyl, i-butylcarbonyl, s-butylcarbonyl, t-butylcarbonyl, c-butylcarbonyl, 1-methyl-c-propylcarbonyl, 2-methyl-c-propylcarbonyl, n-pentylcarbonyl, 1-methyl-n-butylcarbonyl, 2-methyl-n-butylcarbonyl, 3-methyl-n-butylcarbonyl, 1,1-dimethyl-n-propylcarbonyl, 1,2-dimethyl-n-propylcarbonyl, 2,2-dimethyl-n-propylcarbonyl, 1-ethyl-n-propylcarbonyl, c-pentylcarbonyl, 1-methyl-c-butylcarbonyl, 2-methyl-c-butylcarbonyl, 3-methyl-c-butylcarbonyl, 1,2-dimethy-c-propylcarbonyl, 2,3-dimethyl-c-propylcarbonyl, 1-ethyl-c-propylcarbonyl, 2-ethyl-c-propylcarbonyl, n-hexylcarbonyl, 1-methyl-n-pentylcarboyl, 2-methyl-n-pentylcarbonyl, 3-methyl-n-pentylcarbonyl, 4-methyl-n-pentylcarbonyl, 1,1-dimethyl-n-butylcarbonyl, 1,2-dimethyl-n-butylcarbonyl, 1,3-dimethyl-n-butylcarbonyl, 2,2-dimethyl-n-butylcarbonyl, 2,3-dimethyl-n-butylcarbonyl, 3,3-dimethyl-n-butylcarbonyl, 1-ethyl-n-butylcarbonyl, 2-ethyl-n-butylcarbonyl, 1,1,2-trimethyl-n-propylcarbonyl, 1,2,2-trimethyl-n-propylcarbonyl, 1-ethyl-1-methyl-n-propylcarbonyl, 1-ethyl-2-methyl-n-propylcarbonyl, c-hexylcarbonyl, 1-methyl-c-pentylcarbonyl, 2-methyl-c-pentylcarbonyl, 3-methyl-c-pentylcarbonyl, 1-ethyl-c-butylcarbonyl, 2-ethyl-c-butylcarbonyl, 3-ethyl-c-butylcarbonyl, 1,2-dimethyl-c-butylcarbonyl, 1,3-dimethyl-c-butylcarbonyl, 2,2-dimethyl-c-butylcarbonyl, 2,3-dimethyl-c-butylcarbonyl, 2,4-dimethyl-c-butylcarbonyl, 2,3-dimethyl-c-butylcarbonyl, 2,4-dimethyl-c-butylcarbonyl, 3,3-dimethyl-c-butylcarbonyl, 1-n-propyl-c-propylcarbonyl, 2-n-propyl-c-propylcarbonyl, 1-i-propyl-c-propylcarbonyl, 2-i-propyl-c-propylcarbonyl, 1,2,2-trimethyl-c-propylcarbonyl, 1,2,3-trimethyl-c-propylcarbonyl, 2,2,3-trimethyl-c-propylcarbonyl, 1-ethyl-2-methyl-c-propylcarbonyl, 2-ethyl-1-methyl-c-propylcarbonyl, 2-ethyl-2-methyl-c-propylcarbonyl and 2-ethyl-3-methyl-c-propylcarbonyl.

Illustrative examples of the alkenylcarbonyl group of 3 to 11 carbons include ethenylcarbonyl, 1-propenylcarbonyl, 2-propenylcarbonyl, 1-methyl-1-ethenylcarbonyl, 1-butenylcarbonyl, 2-butenylcarbonyl, 3-butenylcarbonyl, 2-methyl-1-propenylcarbonyl, 2-methyl-2-propenylcarbonyl, 1-ethylethenylcarbonyl, 1-methyl-1-propenylcarbonyl, 1-methyl-2-propenylcarbonyl, 1-pentenylcarbonyl, 2-pentenylcarbonyl, 3-pentenylcarbonyl, 4-pentenylcarbonyl, 1-n-propylethenylcarbonyl, 1-methyl-1-butenylcarbonyl, 1-methyl-2-butenylcarbonyl, 1-methyl-3-butenylcarbonyl, 2-ethyl-2-propenylcarbonyl, 2-methyl-1-butenylcarbonyl, 2-methyl-2-butenylcarbonyl, 2-methyl-3-butenylcarbonyl, 3-methyl-1-butenylcarbonyl, 2-methyl-3-butenylcarbonyl, 3-methyl-1-butenylcarbonyl, 3-methyl-2-butenylcarbonyl, 3-methyl-3-butenylcarbonyl, 1,1-dimethyl-2-propenylcarbonyl, 1-i-propylethenylcarbonyl, 1,2-dimethyl-1-propenylcarbonyl, 1,2-dimethyl-2-propenylcarbonyl, 1-c-pentenylcarbonyl, 2-c-pentenylcarbonyl, 3-c-pentenylcarbonyl, 1-hexenylcarbonyl, 2-hexenylcarbonyl, 3-hexenylcarbonyl, 4-hexenylcarbonyl, 5-hexenylcarbonyl, 1-methyl-1-pentenylcarbonyl, 1-methyl-2-pentenylcarbonyl, 1-methyl-3-pentenylcarbonyl, 1-methyl-4-pentenylcarbonyl, 1-n-butylethenylcarbonyl, 2-methyl-1-pentenylcarbonyl, 2-methyl-2-pentenylcarbonyl, 2-methyl-3-pentenylcarbonyl, 2-methyl-4-pentenylcarbonyl, 2-n-propyl-2-propenylcarbonyl, 3-methyl-1-pentenylcarbonyl, 3-methyl-2-pentenylcarbonyl, 3-methyl-3-pentenylcarbonyl, 3-methyl-4-pentenylcarbonyl, 3-ethyl-3-butenylcarbonyl, 4-methyl-1-pentenylcarbonyl, 4-methyl-2-pentenylcarbonyl, 4-methyl-3-pentenylcarbonyl, 4-methyl-4-pentenylcarbonyl, 1,1-dimethyl-2-butenylcarbonyl, 1,1-dimethyl-3-butenylcarbonyl, 1,2-dimethyl-1-butenylcarbonyl, 1,2-dimethyl-2-butenylcarbonyl, 1,2-dimethyl-3-butenylcarbonyl, 1-methyl-2-ethyl-2-propenylcarbonyl, 1-s-butylethenylcarbonyl, 1,3-dimethyl-1-butenylcarbonyl, 1,3-dimethyl-2-butenylcarbonyl, 1,3-dimethyl-3-butenylcarbonyl, 1-i-butylethenylcarbonyl, 2,2-dimethyl-3-butenylcarbonyl, 2,3-dimethyl-1-butenylcarbonyl, 2,3-dimethyl-2-butenylcarbonyl, 2,3-dimethyl-3-butenylcarbonyl, 2-i-propyl-2-propenylcarbonyl, 3,3-dimethyl-1-butenylcarbonyl, 1-ethyl-1-butenylcarbonyl, 1-ethyl-2-butenylcarbonyl, 1-ethyl-3-butenylcarbonyl, 1-n-propyl-1-propenylcarbonyl, 1-n-propyl-2-propenylcarbonyl, 2-ethyl-1-butenylcarbonyl, 2-ethyl-2-butenylcarbonyl, 2-ethyl-3-butenylcarbonyl, 1,1,2-trimethyl-2-propenylcarbonyl, 1-t-butylethenylcarbonyl, 1-methyl-1-ethyl-2-propenylcarbonyl, 1-ethyl-2-methyl-1-propenylcarbonyl, 1-ethyl-2-methyl-2-propenylcarbonyl, 1-i-propyl-1-propenylcarbonyl, 1-i-propyl-2-propenylcarbonyl, 1-methyl-2-c-pentenylcarbonyl, 1-methyl-3-c-pentenylcarbonyl, 2-methyl-1-c-pentenylcarbonyl, 2-methyl-2-c-pentenylcarbonyl, 2-methyl-3-c-pentenylcarbonyl, 2-methyl-4-c-pentenylcarbonyl, 2-methyl-5-c-pentenylcarbonyl, 2-methylene-c-pentylcarbonyl, 3-methyl-1-c-pentenylcarbonyl, 3-methyl-2-c-pentenylcarbonyl, 3-methyl-3-c-pentenylcarbonyl, 3-methyl-4-c-pentenylcarbonyl, 3-methyl-5-c- pentenylcarbonyl, 3-methylene-c-pentylcarbonyl, 1-c-hexenylcarbonyl, 2-c-hexenylcarbonyl and 3-c-hexenylcarbonyl groups.

Illustrative examples of the alkynylcarbonyl group of 3 to 11 carbon atoms include ethynylcarbonyl, 1-propynylcarbonyl, 2-propynylcarbonyl, 1-butynylcarbonyl, 2-butynylcarbonyl, 3-butynylcarbonyl, 1-methyl-2-propynylcarbonyl, 1-pentynylcarbonyl, 2-pentynylcarbonyl, 3-pentynylcarbonyl, 4-pentynylcarbonyl, 1-methyl-2-butynylcarbonyl, 1-methyl-3-butynylcarbonyl, 2-methyl-3-butynylcarbonyl, 3-methyl-1-butynylcarbonyl, 1,1-dimethyl-2-propynylcarbonyl, 2-ethyl-2-propynylcarbonyl, 1-hexynylcarbonyl, 2-hexynylcarbonyl, 3-hexynylcarbonyl, 4-hexynylcarbonyl, 5-hexynylcarbonyl, 1-methyl-2-pentynylcarbonyl, 1-methyl-3-pentynylcarbonyl, 1-methyl-4-pentynylcarbonyl, 2-methyl-3-pentynylcarbonyl, 2-methyl-4-pentynylcarbonyl, 3-methyl-1-pentynylcarbonyl, 3-methyl-4-pentynylcarbonyl, 4-methyl-1-pentynylcarbonyl, 4-methyl-2-pentynylcarbonyl, 1,1-dimethyl-2-butynylcarbonyl, 1,1-dimethyl-3-butynylcarbonyl, 1,2-dimethyl-3-butynylcarbonyl, 2,2-dimethyl-3-butynylcarbonyl, 3,3-dimethyl-1-butynylcarbonyl, 1-ethyl-2-butynylcarbonyl, 1-ethyl-3-butynylcarbonyl, 1-n-propyl-2-propynylcarbonyl, 2-ethyl-3-butynylcarbonyl, 1-methyl-1-ethyl-2-propynyl and 1-i-propyl-2-propynylcarbonyl groups.

Illustrative examples of the alkylcarbonyloxy group of 2 to 11 carbon atoms include methylcarbonyloxy, ethylcarbonyloxy, n-propylcarbonyloxy, i-propylcarbonyloxy, c-propylcarbonyloxy, n-butylcarbonyloxy, i-butylcarbonyloxy, s-butylcarbonyloxy, t-butylcarbonyloxy, c-butylcarbonyloxy, 1-methyl-c-propylcarbonyloxy, 2-methyl-c-propylcarbonyloxy, n-pentylcarbonyloxy, 1-methyl-n-butylcarbonyloxy, 2-methyl-n-butylcarbonyloxy, 3-methyl-n-butylcarbonyloxy, 1,1-dimethyl-n-propylcarbonyloxy, 1,2-dimethyl-n-propylcarbonyloxy, 2,2-dimethyl-n-propylcarbonyloxy, 1-ethyl-n-propylcarbonyloxy, c-pentylcarbonyloxy, 1-methyl-c-butylcarbonyloxy, 2-methyl-c-butylcarbonyloxy, 3-methyl-c-butylcarbonyloxy, 1,2-dimethyl-c-propylcarbonyloxy, 2,3-dimethyl-c-propylcarbonyloxy, 1-ethyl-c-propylcarbonyloxy, 2-ethyl-c-propylcarbonyloxy, n-hexylcarbonyloxy, 1-methyl-n-pentylcarbonyloxy, 2-methyl-n-pentylcarbonyloxy, 3-methyl-n-pentylcarbonyloxy, 4-methyl-n-pentylcarbonyloxy, 1,1-dimethyl-n-butylcarbonyloxy, 1,2-dimethyl-n-butylcarbonyloxy, 1,3-dimethyl-n-butylcarbonyloxy, 2,2-dimethyl-n-butylcarbonyloxy, 2,3-dimethyl-n-butylcarbonyloxy, 3,3-dimethyl-n-butylcarbonyloxy, 1-ethyl-n-butylcarbonyloxy, 2-ethyl-n-butylcarbonyloxy, 1,1,2-trimethyl-n-propylcarbonyloxy, 1,2,2-trimethyl-n-propylcarbonyloxy, 1-ethyl-1-methyl-n-propylcarbonyloxy, 1-ethyl-2-methyl-n-propylcarbonyloxy, c-hexylcarbonyloxy, 1-methyl-c-pentylcarbonyloxy, 2-methyl-c-pentylcarbonyloxy, 3-methyl-c-pentylcarbonyloxy, 1-ethyl-c-butylcarbonyloxy, 2-ethyl-c-butylcarbonyloxy, 3-ethyl-c-butylcarbonyloxy, 1,2-dimethyl-c-butylcarbonyloxy, 1,3-dimethyl-c-butylcarbonyloxy, 2,2-dimethyl-c-butylcarbonyloxy, 2,3-dimethyl-c-butylcarbonyloxy, 2,4-dimethyl-c-butylcarbonyloxy, 3,3-dimethyl-c-butylcarbonyloxy, 1-n-propyl-c-propylcarbonyloxy, 2-n-propyl-c-propylcarbonyloxy, 1-i-propyl-c-propylcarbonyloxy, 2-i-propyl-c-propylcarbonyloxy, 1,2,2-trimethyl-c-propylcarbonyloxy, 1,2,3-trimethyl-c-propylcarboyloxy, 2,2,3-trimethyl-c-propylcarbonyloxy, 1-ethyl-2-methyl-c-propylcarbonyloxy, 2-ethyl-1-methyl-c-propylcarbonyloxy, 2-ethyl-2-methyl-c-propylcarbonyloxy and 2-ethyl-3-methyl-c-propylcarbonyloxy groups.

Illustrative examples of the alkenylcarbonyloxy group of 3 to 11 carbon atoms include ethenylcarbonyoxy, 1-propenylcarbonyloxy, 2-propenylcarbonyloxy, 1-methyl-1-ethenylcarbonyloxy, 1-butenylcarbonyloxy, 2-butenylcarbonyloxy, 3-butenylcarbonyloxy, 2-methyl-1-propenylcarbonyloxy, 2-methyl-2-propenylcarbonyloxy, 1-ethylethenylcarbonyloxy, 1-methyl-1-propenylcarbonyloxy, 1-methyl-2-propenylcarbonyloxy, 1-pentenylcarbonyloxy, 2-pentenylcarbonyloxy, 3-pentenylcarbonyloxy, 4-pentenylcarbonyloxy, 1-n-propylethenylcarbonyloxy, 1-methyl-1-butenylcarbonyloxy, 1-methyl-2-butenylcarbonyloxy, 1-methyl-3-butenylcarbonyloxy, 2-ethyl-2-propenylcarbonyloxy, 2-methyl-1-butenylcarbonyloxy, 2-methyl-2-butenylcarbonyloxy, 2-methyl-3-butenylcarbonyloxy, 3-methyl-1-butenylcarbonyloxy, 3-methyl-2-butenylcarbonyloxy, 3-methyl-3-butenylcarbonyloxy, 1,1-dimethyl-2-propenylcarbonyloxy, 1-i-propylethenylcarbonyloxy, 1,2-dimethyl-1-propenylcarbonyloxy, 1,2-dimethyl-2-propenylcarbonyloxy, 1-c-pentenylcarbonyloxy, 2-c-pentenylcarbonyloxy, 3-c-pentenylcarbonyloxy, 1-hexenylcarbonyloxy, 2-hexenylcarbonyloxy, 3-hexenylcarbonyloxy, 4-hexenylcarbonyloxy, 5-hexenylcarbonyloxy, 1-methyl-1-pentenylcarbonyloxy, 1-methyl-2-pentenylcarbonyloxy, 1-methyl-3-pentenylcarbonyloxy, 1-methyl-4-pentenylcarbonyloxy, 1-n-butylethenylcarbonyloxy, 2-methyl-1-pentenylcarbonyloxy, 2-methyl-2-pentenylcarbonyloxy, 2-methyl-3-pentenylcarbonyloxy, 2-methyl-4-pentenylcarbonyloxy, 2-n-propyl-2-propenylcarbonyloxy, 3-methyl-1-pentenylcarbonyloxy, 3-methyl-2-pentenylcarbonyloxy, 3-methyl-3-pentenylcarbonyloxy, 3-methyl-4-pentenylcarbonyloxy, 3-ethyl-3-butenylcarbonyloxy, 4-methyl-1-pentenylcarbonyloxy, 4-methyl-2-pentenylcarbonyloxy, 4-methyl-3-pentenylcarbonyloxy, 4-methyl-4-pentenylcarbonyloxy, 1,1-dimethyl-2-butenylcarbonyloxy, 1,1-dimethyl-3-butenylcarbonyloxy, 1,2-dimethyl-1-butenylcarbonyloxy, 1,2-dimethyl-2-butenylcarbonyloxy, 1,2-dimethyl-3-butenylcarbonyloxy, 1-methyl-2-ethyl-2-propenylcarbonyloxy, 1-s-butylethenylcarbonyloxy, 1,3-dimethyl-1-butenylcarbonyloxy, 1,3-dimethyl-2-butenylcarbonyloxy, 1,3-dimethyl-3-butenylcarbonyloxy, 1-i-butylethenylcarbonyloxy, 2,2-dimethyl-3-butenylcarbonyloxy, 2,3-dimethyl-1-butenylcarbonyloxy, 2,3-dimethyl-2-butenylcarbonyloxy, 2,3-dimethyl-3-butenylcarbonyloxy, 2-i-propyl-2-propenylcarbonyloxy, 3,3-dimethyl-1-butenylcarbonyloxy, 1-ethyl-1-butenylcarbonyloxy, 1-ethyl-2-butenylcarbonyloxy, 1-ethyl-3-butenylcarbonyloxy, 1-n-propyl-1-propenylcarbonyloxy, 1-n-propyl-2-propenylcarbonyloxy, 2-ethyl-1-butenylcarbonyloxy, 2-ethyl-2-butenylcarbonyloxy, 2-ethyl-3-butenylcarbonyloxy, 1,1,2-trimethyl-2-propenylcarbonyloxy, 1-t-butylethenylcarbonyloxy, 1-methyl-1-ethyl-2-propenylcarbonyloxy, 1-ethyl-2-methyl-1-propenylcarbonyloxy, 1-ethyl-2-methyl-2-propenylcarbonyloxy, 1-i-propyl-1-propenylcarbonyloxy, 1-i-propyl-2-propenylcarbonyloxy, 1-methyl-2-c-pentenylcarbonyloxy, 1-methyl-3-c-pentenylcarbonyloxy, 2-methyl-1-c-pentenylcarbonyloxy, 2-methyl-2-c-pentenylcarbonyloxy, 2-methyl-3-c-pentenylcarbonyloxy, 2-methyl-4-c-pentenylcarbonyloxy, 2-methyl-5-c-pentenylcarbonyloxy, 2-methylene-c-pentylcarbonyloxy, 3-methyl-1-c-pentenylcarbonyloxy, 3-methyl-2-c-pentenylcarbonyloxy, 3-methyl-3-c-pentenylcarbonyloxy, 3-methyl-4-c-pentenylcarbonyloxy, 3-methyl-5-c-pentenylcarbonyloxy, 3-methylene-c-pentylcarbonyloxy, 1-c-hexenylcarbonyloxy, 2-c-hexenylcarbonyloxy and 3-c-hexenylcarbonyloxy groups.

Illustrative examples of the alkynylcarbonyloxy group of 3 to 11 carbons include ethynylcarbonyloxy, 1-propynylcarbonyloxy, 2-propynylcarbonyloxy, 1-butynylcarbonyloxy, 2-butynylcarbonyloxy, 3-butynylcarbonyloxy, 1-methyl-2-propynylcarbonyloxy, 1-pentynylcarbonyloxy, 2-pentynylcarbonyloxy, 3-pentynylcarbonyloxy, 4-pentynylcarbonyloxy, 1-methyl-2-butynylcarbonyloxy, 1-methyl-3-butynylcarbonyloxy, 2-methyl-3-butynylcarbonyloxy, 3-methyl-1-butynylcarbonyloxy, 1,1-dimethyl-2-propynylcarbonyloxy, 2-ethyl-2-propynylcarbonyloxy, 1-hexynylcarbonyloxy, 2-hexynylcarbonyloxy, 3-hexynylcarbonyloxy, 4-hexynylcarbonyloxy, 5-hexynylcarbonyloxy, 1-methyl-2-pentynylcarbonyloxy, 1-methyl-3-pentynylcarbonyloxy, 1-methyl-4-pentynylcarbonyloxy, 2-methyl-3-pentynylcarbonyloxy, 2-methyl-4-pentynylcarbonyloxy, 3-methyl-1-pentynylcarbonyloxy, 3-methyl-4-pentynylcarbonyloxy, 4-methyl-1-pentynylcarbonyloxy, 4-methyl-2-pentynylcarbonyloxy, 1,1-dimethyl-2-butynylcarbonyloxy, 1,1-dimethyl-3-butynylcarbonyloxy, 1,2-dimethyl-3-butynylcarbonyloxy, 2,2-dimethyl-3-butynylcarbonyloxy, 3,3-dimethyl-1-butynylcarbonyloxy, 1-ethyl-2-butynylcarbonyloxy, 1-ethyl-3-butynylcarbonyloxy, 1-n-propyl-2-propynylcarbonyloxy, 2-ethyl-3-butynylcarbonyloxy, 1-methyl-1-ethyl-2-propynylcarbonyloxy and 1-i-propyl-2-propynylcarbonyloxy groups.

Illustrative examples of the aryl group of 6 to 11 carbon atoms, the halogenated aryl group of 6 to 11 carbon atoms, the heteroaryl group of 3 to 11 carbon atoms and the halogenated heteroaryl group of 3 to 11 carbon atoms include phenyl, o-chlorophenyl, m-chlorophenyl, p-chlorophenyl, o-fluorophenyl, p-fluorophenyl, α-naphthyl, β-naphthyl, furyl, chlorofuryl, fluorofuryl, thienyl, chlorothienyl, fluorothienyl, pyrrolyl, chloropyrrolyl, fluoropyrrolyl, imidazolyl, chloroimidazolyl and fluoroimidazolyl groups.

In the ion-conductive fused-ring quinone polymer of the invention, the content of recurring units of formula (1) and/or (2) is preferably from 10 to 100 mol %, more preferably from 30 to 100 mol %, and even more preferably from 50 to 100 mol %, of all the recurring units.

The ion-conductive fused-ring quinone polymer of the invention may additionally include recurring units of formula (3) below.

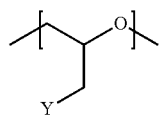

(3)

In formula (3), Y is a halogen atom. Preferred examples of the halogen atom include chloride, bromide and iodide ions.

The content of recurring units of formula (3) is preferably from 0 to 90 mol %, more preferably from 0 to 70 mol %, and even more preferably from 0 to 50 mol %, of all the recurring units.

The ion-conductive fused-ring quinone polymer of the invention may additionally include recurring units of formula (4) below.

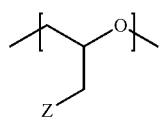

(4)

In formula (4), Z is an alkoxy group of 1 to 12 carbon atoms such as a methoxy or ethoxy group, an alkyl group of 1 to 12 carbon atoms such as a methyl or ethyl group, an alkylthio group of 1 to 12 carbon atoms, an acyl group of 1 to 12 carbon atoms, an alkylamino group of 1 to 12 carbon atoms, a polyalkylene ether group such as polyethylene glycol, a polyalkyleneamine group such as polyethyleneimine, or an aryl group.

The content of recurring units of formula (4) is preferably from 0 to 10 mol %, more preferably from 0 to 5 mol %, and even more preferably from 0 to 1 mol %, of all the recurring units.

The ion-conductive fused-ring quinone polymer of the invention may additionally include recurring units of formula (4') below

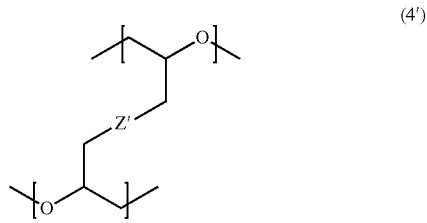

(4')

In formula (4'), Z' is —O—$(CH_2)_a$—O—, —$(CH_2)_a$—, —S—$(CH_2)_a$—S—, —C(=O)—$(CH_2)_b$—C(=O)—, —NH—$(CH_2)_a$—NH—, —O—$(R—O)_c$—, —NH—$(R—NH)_c$— or a phenylene group; R is an alkylene group of 1 to 12 carbon atoms; the letter a is an integer from 1 to 12, the letter b is an integer from 1 to 10, and the letter c is an integer from 2 to 4.

The content of recurring units of formula (4') is preferably from 0 to 80 mol %, and more preferably from 0 to 50 mol %, of all the recurring units.

To minimize dissolution in the electrolyte solution, the ion-conductive fused-ring quinone polymer of the invention has a weight-average molecular weight (Mw) of preferably at least 1,000, more preferably at least 10,000, and even more preferably at least 100,000. From the standpoint of solubility in the subsequently described electrode slurry-forming solvent, the molecular weight is preferably not more than 5,000,000, more preferably not more than 3,000,000, and even more preferably not more than 2,000,000. In this invention, Mw refers to the polystyrene-equivalent weight-average molecular weight measured by gel permeation chromatography (GPC).

Next, exemplary methods for synthesizing the ion-conductive fused-ring quinone polymer of the invention are described.

First, as shown in Scheme A below, epihalohydrin is subjected to ring-opening polymerization within a solvent using a polymerization catalyst such as an organoaluminum complex or a boron trifluoride-ether complex, thereby synthesizing an ion-conductive polymer made up of recurring units of formula (3) that form the main chain.

Scheme A

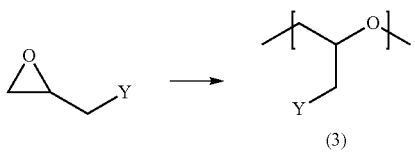

(3)

Here, Y is as defined above.

This ring-opening polymerization may be carried out by a method known to the art. Regioisomers that form as by-products during synthesis may be present within the reaction product. Alternatively, a commercial product may be used as the polymer made up of recurring units of formula (3).

An ion-conductive fused-ring quinone polymer containing recurring units of formula (1) and recurring units of formula (3) can be synthesized by, for example, as shown in Scheme B below, reacting an ion-conductive polymer made up of recurring units of formula (3) with a fused-ring quinone derivative of formula (5) within a solvent.

formula (3) can be synthesized by, for example, as shown in Scheme C below, reacting an ion-conductive polymer made up of recurring units of formula (3) with a fused-ring quinone derivative of formula (6) within a solvent.

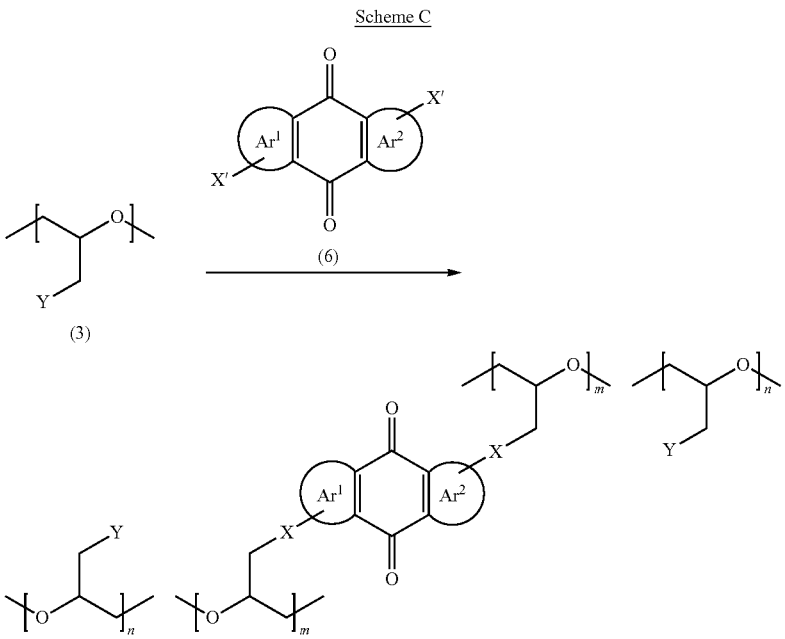

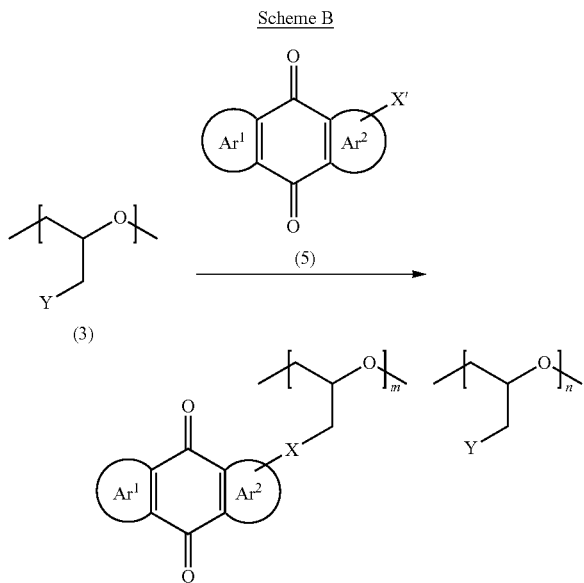

Here, X, Y, Ar$^1$ and Ar$^2$ are as defined above. X' is a hydrogen atom, a hydroxyl group, an amino group or a carboxyl group. The letters m and n are positive numbers which represent the contents (molar ratios) of the recurring units and satisfy the conditions $0.01 \leq m \leq 1.0$, $0 \leq n \leq 0.99$ and $0.01 \leq m+n \leq 1.0$.

An ion-conductive fused-ring quinone polymer containing recurring units of formula (2) and recurring units of Here, X, X', Y, Ar$^1$, Ar$^2$, m and n are as defined above.

The epihalodyrin and the fused-ring quinone derivative may be acquired as commercial products or may be produced by a combination of known reactions.

The fused-ring quinone derivative of formula (5) or (6) may be of one type used alone or may be of two or more types used in combination.

A polymer containing only recurring units of formula (1) or (2) can be synthesized by reacting the fused-ring quinone derivative in a molar amount that is the same as or greater than the molar amount of recurring units of formula (3). Alternatively, unsubstituted alkyl halide-substituted ethylene oxide moieties can be left on the polymer by reacting the fused-ring quinone derivative in a molar amount that is smaller than the molar amount of recurring units of formula (3).

When synthesizing a polymer containing only recurring units of formula (1) or (2), the compound of formula (5) or (6) is used in an amount of preferably from 1 to 10 moles, more preferably from 1 to 5 moles, and even more preferably from 1 to 2 moles, per mole of recurring units of formula (3). When synthesizing a polymer containing recurring units of formula (3) in addition to recurring units of formula (1) or (2), the compound of formula (5) or (6) is used in an amount of preferably from 0.01 to 1 mole, more preferably from 0.1 to 0.9 mole, and even more preferably from 0.5 to 0.8 mole, per mole of recurring units of formula (3).

The solvent used in the reactions shown in Schemes B and C are not particularly limited, provided they do not impart an adverse effect on the reaction and they have sufficient solvency with respect to both the reagents used in synthesis and the product. Examples of solvents that can be used include dichloromethane, 1,2-dichloroethane, toluene, xylene, chlorobenzene, o-dichlorobenzene, ethyl acetate, methanol, ethanol, tetrahydrofuran (THF), dioxane, dimethylformamide (DMF), dimethylacetamide (DMAc), N-methyl-2-pyrrolidone (NMP) and water.

In the reaction shown in Scheme B or C, the reaction temperature is generally from about 20° C. to about 100° C., and preferably from 50° C. to 80° C. The reaction time is generally from about 1 hour to about 300 hours, and preferably from 100 to 280 hours.

After synthesizing a polymer made up of recurring units of formula (3), by also reacting at the same time a fused-ring quinone derivative of formula (5) or (6), a polymer containing both recurring units of formula (1) and (2) can be synthesized. That is, a polymer of the following formula can be synthesized.

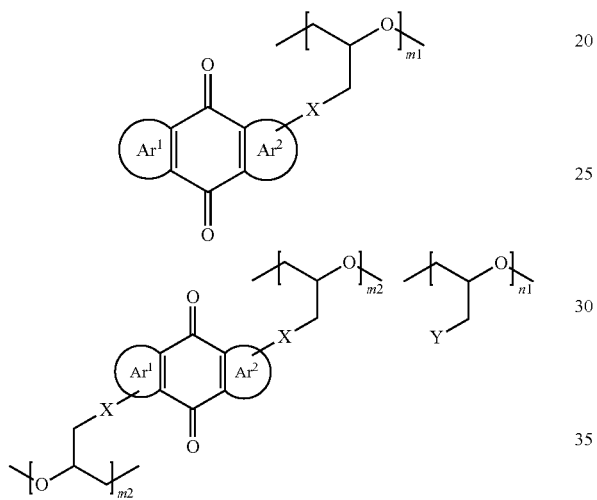

Here, X, Y, $Ar^1$ and $Ar^2$ are as defined above. Also, m1, m2 and n1 are positive numbers which represent the contents (molar ratios) of the recurring units and satisfy the conditions $0<m1<1.0$, $0<m2<1.0$, $0 \le n1 \le 0.99$, $0.01 \le m1+m2 \le 1.0$ and $0.01 \le m1+m2+n1 \le 1.0$.

The reaction conditions used at this time, such as the solvent, reaction temperature and reaction time, may be the same as those mentioned for the reaction shown in Scheme B or Scheme C.

In addition, when recurring units of formula (4) are to be included, compounds such as various alcohols, amines, alkylating agents, hexamethylenediamine, tetraethylene glycol, polyethyleneimine or polyvinyl alcohol may be reacted with the polymer obtained by the reaction shown in Scheme B or Scheme C. Such compounds to be reacted are used at this time in an amount of preferably from 0.001 to 0.01 mole, more preferably from 0.001 to 0.05 mole, and even more preferably from 0.001 to 0.1 mole, per mole of recurring units of formula (3).

Other examples of methods for synthesizing ion-conductive fused-ring quinone polymers of formula (1) or (2) include methods wherein, as shown in Schemes D and E below, an epoxy group-containing fused-ring quinone compound (7) or (8) is subjected to ring-opening polymerization using a polymerization catalyst such as an organoaluminum complex or a boron trifluoride-ether complex.

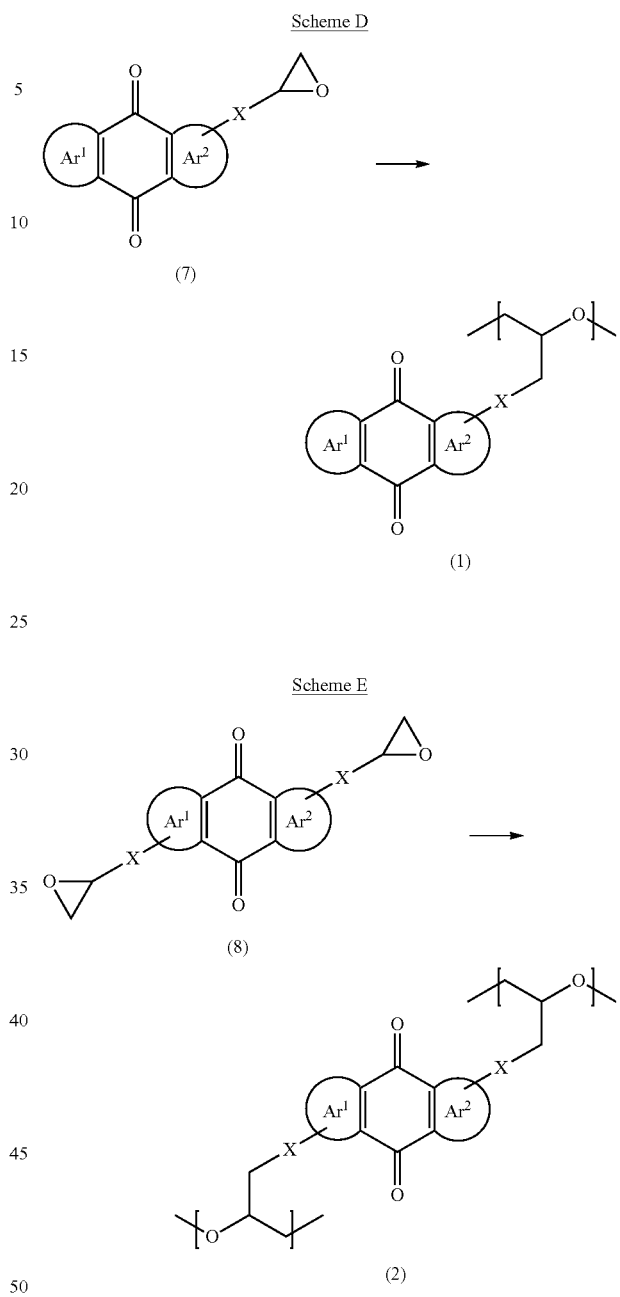

Here, $Ar^1$, $Ar^2$ and X are as defined above.

The solvents used at this time are exemplified in the same way as the solvents used in the reactions shown in Schemes B and C.

A polymer containing recurring units of formula (1) and recurring units of formula (2) can be synthesized by mixing fused-ring quinone compounds (7) and (8) and subjecting them together to ring-opening polymerization.

A polymer containing also, in addition to recurring units of formula (1) or (2), recurring units of formula (3), (4) and/or (4') can be synthesized by subjecting fused-ring quinone compound (7) or (8), epihalohydrin, and a compound of formula (9) and/or (9') to ring-opening polymerization using a polymerization catalyst.

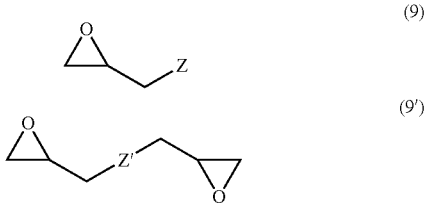

Here, Z and are as defined above.

For example, as shown in Scheme F below, a polymer containing recurring units of formula (1) and recurring units of formula (4') can be synthesized by subjecting the fused-ring quinone compound (7) and the compound of formula (9') to ring-opening polymerization.

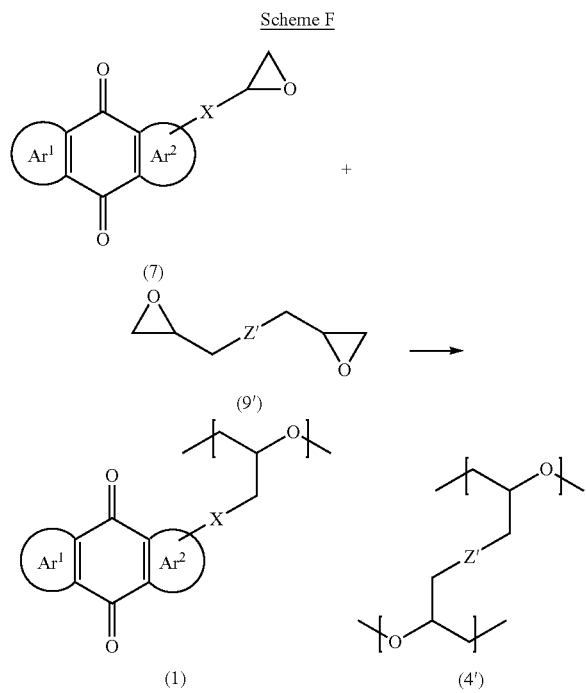

Here, Ar¹, Ar², X and are as defined above.

The epihalohydrin or the glycidyl group-containing compound that provides recurring units of formula (9') is used in an amount of preferably from 0 to 80 mol %, more preferably from 0 to 50 mol %, and even more preferably from 0 to 20 mol % per mole of fused-ring quinone compound (7) or (8). Likewise, the compound of formula (9) or (9') is used in an amount of preferably from 0 to 80 mol %, more preferably from 0 to 50 mol %, and even more preferably from 0 to 20 mol % per mole of fused-ring quinone compound (7) or (8).

Fused-ring quinone compounds (7) and (8) may be produced by a combination of known reactions. The compounds of formula (9) or (9') may be acquired as commercial products or may be produced by a combination of known reactions.

Charge Storage Material

The ion-conductive fused-ring quinone polymer of the invention can be suitably used as a charge storage material. A charge storage material is a material that is capable of storing electrical charge. Such a material is useful as, for example, an electrode active material in secondary batteries.

Secondary Battery

The secondary battery of the invention is characterized by using a charge storage material made of the above-described ion-conductive fused-ring quinone polymer as an electrode active material. Other constituent members of the battery cell may be suitably selected from among conventional known members and used.

An ordinary secondary battery is explained here by way of illustration.

A secondary battery is generally composed of a positive electrode layer, a negative electrode layer, a separator layer situated between the positive electrode layer and the negative electrode layer, and an electrolyte solution that fills the interior of the cell containing all of these elements. The positive electrode layer and negative electrode layer are each formed, on a substrate that is a current collector, as a thin-film which includes an electrode active material, an optional conductive additive of carbon or the like for enhancing the conductivity of the electrode layer, and an optional binder for enhancing the uniformity of film formation, increasing ionic conductivity and minimizing dissolution in the electrolyte solution. The electrolyte solution is composed of an electrolyte made of a salt that serves as the ion conductor, a solvent and the like.

The ion-conductive fused-ring quinone polymer of the invention is used as the electrode active material in this positive electrode layer or negative electrode layer. There is no particular limitation on which of the electrode layers—the positive electrode layer or the negative electrode layer—in which to use the electrode active material, this being determined according to whether the corresponding electrode has a noble potential or a base potential. Alternatively, this electrode active material may be used in both electrodes.

The form of the secondary battery and the types of electrode active material and electrolyte solution are not particularly limited. Use may be made of, for example, any of the following: lithium ion batteries, nickel-hydrogen batteries, manganese batteries, and air batteries. Nor are there any particular limitations on the lamination method and the production method.

The electrode layer can be produced by mixing together the ion-conductive fused-ring quinone polymer of the invention, a solvent and, optionally, a conductive additive, a binder and other electrode active materials known to the art so as to prepare an electrode slurry, and using this slurry to form a thin-film on a substrate. The method of forming the thin-film is not particularly limited; use can be made of various hitherto known methods. Illustrative examples include various printing methods, such as offset printing, screen printing and gravure printing, and also dip coating, spin coating, bar coating, slit (die) coating and inkjet printing methods that use a solution, suspension or slurry obtained by dissolving or suspending a material containing the ion-conductive fused-ring quinone polymer of the invention in a solvent.

Illustrative examples of the current collector used as the material underlying the electrode layer include metal foils or substrates of aluminum, copper, lithium, stainless steel, iron, chromium, platinum, gold or the like; alloy foils or substrates composed of any combination of these metals; oxide substrates such as indium-tin oxide (ITO), indium-zinc oxide (IZO) and antimony-tin oxide (ATO); carbon substrates such as glassy carbon, pyrolytic graphite and carbon felt; and carbon-coated foils such as metal foils coated with a carbon material.

Illustrative examples of the conductive additive include carbon materials such as graphite, carbon black, acetylene black, vapor-grown carbon fibers (VGCF), single-walled carbon nanotubes, multi-walled carbon nanotubes, carbon nanohorns and graphene; and electrically conductive polymers such as polyaniline, polypyrrole, polythiophene, polyacetylene and polyacene. A single type of conductive additive may be used alone or two or more types may be used in combination.

Illustrative examples of the binder include polytetrafluoroethylene, polyvinylidene fluoride, polyhexafluoropropylene, vinylidene fluoride-hexafluoropropylene copolymer, polyvinyl chloride, polycarbonate, polystyrene, polyacrylic acid, polyacrylic acid salts, polyacrylic acid esters, polymethacrylic acid, polymethacrylic acid salts, polymethacrylic acid esters, polyester, polysulfone, polyphenylene oxide, polybutadiene, poly(N-vinylcarbazole), hydrocarbon resins, ketone resins, phenoxy resins, polyamide, ethyl cellulose, vinyl acetate, ABS resins, SBR resins, polyurethane resins, melamine resins, unsaturated polyester resins, alkyd resins, epoxy resins, silicone resins, and copolymers or polymer blends composed of any combination of these.

Illustrative examples of the electrode slurry-forming solvent include NMP, dimethylsulfoxide, ethylene carbonate, propylene carbonate, dimethyl carbonate, diethyl carbonate, methyl ethyl carbonate, γ-butyrolactone, THF, dioxolane, sulfolane, DMF, DMAc, water, 2-propanol and propylene glycol.

When an electrode active material containing the ion-conductive fused-ring quinone polymer of the invention is used in the positive electrode layer, the negative electrode active material included in the negative electrode layer is exemplified by carbon materials such as graphite, carbon black, acetylene black, vapor-grown carbon fibers (VGCF), carbon nanotubes, carbon nanohorns and graphene; lithium and lithium alloys such as Li—Al, Li—Si and Li—Sn; and silicon, SiO, $SiO_2$, Si—$SiO_2$ composites, tin, SnO, $SnO_2$, PbO, $PbO_2$, GeO, $GeO_2$, $WO_2$, $MoO_2$, $Fe_2O_5$, $Nb_2O_5$, $TiO_2$, $Li_4Ti_5O_{12}$ and $Li_2Ti_3O_7$. When an electrode active material containing the ion-conductive fused-ring quinone polymer of the invention is used in the negative electrode layer, it may also be used together with these negative electrode active materials.

When the ion-conductive fused-ring quinone polymer-containing electrode active material of the invention is used in a negative electrode layer, the positive electrode active material included in the positive electrode layer is exemplified by organic electrode active materials such as nitroxyl radical-containing compounds, organosulfur polymers, quinone polymers other than the ion-conductive fused-ring quinone polymer of the invention, quinoid materials, dione materials and rubeanic acid materials; and inorganic electrode active materials such as $LiCoO_2$, $LiMn_2O_4$, $LiNiO_2$, $LiNi_{0.5}Mn_{0.5}O_2$, $LiFePO_4$, $LiMnPO_4$, $LiCoPO_4$, $Fe_2(SO_4)_3$, $LiMnSiO_4$ and $V_2O_5$. When the ion-conductive fused-ring quinone polymer-containing electrode active material of the invention is used in the positive electrode layer, it may also be used together with these positive electrode active materials.

The ion-conductive fused-ring quinone polymer-containing electrode active material of the invention may be used as an air electrode (positive electrode) in an air battery. In such cases, in addition to the above-mentioned negative electrode active materials, sodium, magnesium, aluminum, calcium, zinc or the like may be used as a negative electrode active material included within the negative electrode layer.

In cases where a positive electrode is used as the air electrode in an air battery, in addition to the ion-conductive fused-ring quinone polymer of the invention, an inorganic material such as manganese oxide or a nitroxyl radical-containing material such as a TEMPO polymer may be concomitantly used as a redox auxiliary within the positive electrode layer.

The thickness of the electrode layer, although not particularly limited, is preferably from about 0.01 μm to about 1,000 μm, and more preferably from about 0.1 μm to about 100 μm.

The material used in the separator layer is exemplified by porous polyolefins, polyamides and polyesters.

The electrolyte in the electrolyte solution is exemplified by lithium salts such as $LiPF_6$, $LiBF_4$, $LiN(C_2F_5SO_2)_2$, $LiAsF_6$, $LiSbF_6$, $LAlF_4$, $LiGaF_4$, $LiInF_4$, $LiClO_4$, $LiN(CF_3SO_2)_2$, $LiCF_3SO_3$, $LiSiF_6$ and $LiN(CF_3SO_2)(C_4F_9SO_2)$; metal iodides such as LiI, NaI, KI, CsI and $CaI_2$; iodide salts of quaternary imidazolinium compounds, iodide salts and perchlorate salts of tetraalkylammonium compounds; and metal bromides such as LiBr, NaBr, KBr, CsBr and $CaBr_2$.

Use can also be made of solid electrolytes such as polyethylene oxide materials, thio-LISICON materials such as $Li_2S$—$P_2S_5$, and polymer compounds obtained by polymerizing or copolymerizing monomers such as hexafluoropropylene, tetrafluoroethylene, trifluoroethylene, ethylene, propylene, acrylonitrile, vinylidene chloride, acrylic acid, methacrylic acid, methyl acrylate, ethyl acrylate, methyl methacrylate, styrene and vinylidene fluoride.

The solvent in the electrolyte solution is not particularly limited, provided it is one that dissolves the electrolyte without degrading battery performance by causing corrosion or decomposition of the materials making up the battery. Illustrative examples include aqueous solvents such as water, and various nonaqueous solvents, including carbonates such as dimethyl carbonate, diethyl carbonate, ethyl methyl carbonate, ethylene carbonate, propylene carbonate and butylene carbonate, ethers such as THF, dimethoxyethane and tetraglyme, esters such as γ-butyrolactone, nitriles such as acetonitrile, amides such as N,N-dimethylformamide and N-methylpyrrolidone, sulfones such as ethyl isopropyl sulfone and sulfolane, alcohols such as 2-propanol and propylene glycol, and ionic liquids such as 1-butyl-3-methylimidazolinium hexafluorophosphate. A single type of solvent may be used alone or two or more types may be used in combination.

EXAMPLES

Synthesis Examples, Working Examples of the invention and Comparative Examples are given below by way of illustration, although the invention is not limited by these Examples. The instruments and measurement conditions used were as follows.

(1) $^1$H-NMR

ECX-500 Nuclear Magnetic Resonance Spectrometer from JEOL Ltd. (solvent, $CDCl_3$; internal standard, TMS)

(2) Elemental Analysis

PE2400 Series II Elemental Analyzer from Perkin Elmer (3) Cyclic Voltammetry

ALSCHI760EW Electrochemical Analyzer, from BAS Inc.

(4) Evaluation of Battery Characteristics

ALSCHI760EW Electrochemical Analyzer, from BAS Inc.

[1] Synthesis of Ion-Conductive Fused-Ring Quinone Polymer

Example 1: Synthesis of Ion-Conductive Fused-Ring Quinone Polymer A

Ion-Conductive Fused-Ring Quinone Polymer A was synthesized by the following scheme.

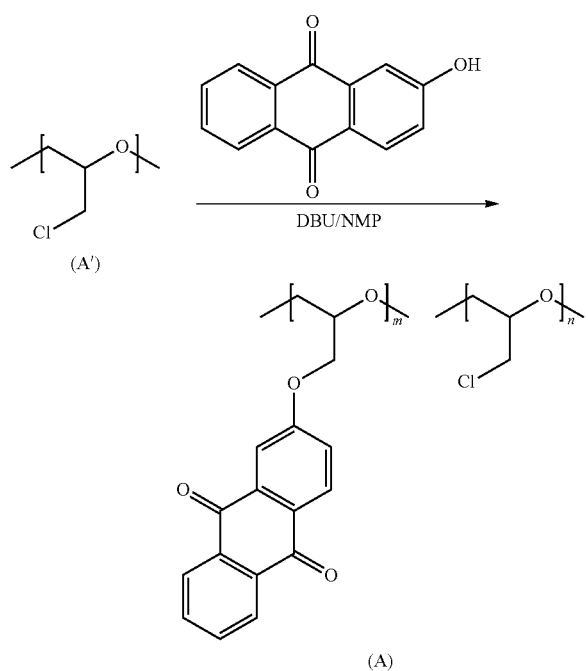

(A')

(A)

Example 2: Synthesis of Ion-Conductive Fused-Ring Quinone Polymer B

Ion-Conductive Fused-Ring Quinone Polymer B was synthesized by the following scheme.

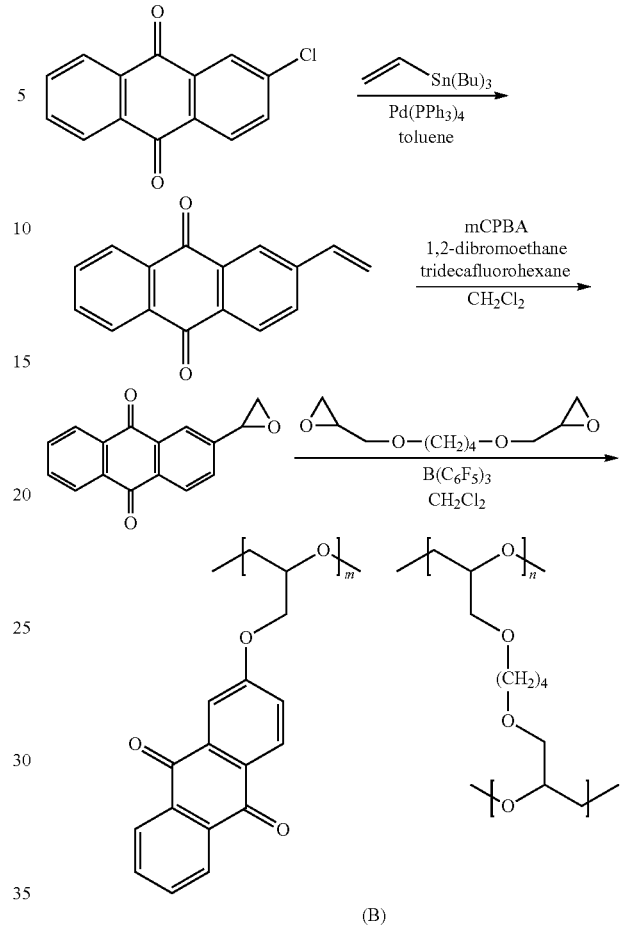

(B)

The following were added to a 200 mL round-bottomed flask and then heated at 80° C. under stirring in a nitrogen atmosphere: 1 g (10.8 mmol) of polyepichlorohydrin (from Sigma-Aldrich; weight-average molecular weight, 700,000; prior to use, this was purified by precipitation in benzene-methanol solvent and vacuum-dried), 2.66 g (12 mmol) of 2-hydroxyanthraquinone, and 54 mL of N-methylpyrrolidone. After dissolution was confirmed, 1.8 g (12 mmol) of diazabicycloundecene was added and reacted at 80° C. for one week. Following reaction completion, the reaction product was purified by precipitation in methanol, giving Ion-Conductive Fused-Ring Quinone Polymer A as a purple solid. Upon comparing the area ratios for the main chain peaks and the aromatic ring peaks obtained by NMR measurement, the amount of anthraquinone moieties introduced onto the polymer was calculated to be about 60 mol %. The $^1$H-NMR results are given below.

$^1$H-NMR (CDCl$_3$, 500 MHz, ppm):

8.11-6.91 (br, 3.9H, Ph), 4.32-3.41 (br, 5H, aliphatic)

The following were dissolved in 51.5 mL of toluene within a 200 mL round-bottomed flask: 2.5 g (10.3 mmol) of 2-chloroanthraquinone, 4.9 g (15.5 mmol) of vinyltributyltin and 357 mg (0.31 mmol) of Pd(PPh$_3$)$_4$. The resulting solution was reacted 14 hours at 100° C., following which the reaction product was purified by liquid-liquid extraction and column chromatography, giving 1.8 g of 2-vinylanthraquinone.

Next, 500 mg (2.13 mmol) of the resulting 2-vinylanthraquinone, 551 mg (3.20 mmol) of m-chlorobenzoic acid, 20 mL of 1,2-dibromoethane and 20 mL of tridecafluorohexane were dissolved in 20 mL of dichloromethane. The resulting solution was reacted 48 hours at room temperature, following which the reaction product was purified by liquid-liquid extraction and column chromatography, giving 331 mg of 2-epoxyanthraquinone.

Next, 250 mg (1.0 mmol) of the resulting 2-epoxyanthraquinone, 20.2 mg (0.10 mmol) of 1,4-butanediol diglycidyl ether (Sigma-Aldrich) and 5.12 mg (0.01 mmol) of tri(pentafluorophenyl)borane were dissolved in 10 mL of dichloromethane and reacted 24 hours at −11° C. in a nitrogen atmosphere. Following reaction completion, Soxhlet purification with methanol yielded Ion-Conductive Fused-Ring Quinone Polymer B (60 mg). Electrochemical measurement was carried out, based on which the content of anthraquinone-containing units, as determined from the resulting charge-discharge capacity, was calculated to be 51 mol %.

[2] Evaluation of Electrodes and Batteries Containing Ion-Conductive Fused-Ring Quinone Polymer Examples 3 and 4: Cyclic Voltammetry of Thin-Film Electrodes Produced Using Ion-Conductive Fused-Ring Quinone Polymer a Cyclic voltammetry was carried out using the beaker cell shown in FIG. 1.

First, 80 mg of carbon powder and 10 mg of polyvinylidene fluoride powder dissolved in 1 g of NMP were added to 10 mg of Ion-Conductive Fused-Ring Quinone Polymer A synthesized in Example 1, and these ingredients were kneaded by a ball mill. The mixture obtained by about 15 minutes of mixing was coated onto a glassy carbon substrate, then vacuum-dried under heating at room temperature (20° C.) for 12 hours, giving a thin-film electrode 11.

The resulting electrode was then immersed in an electrolyte solution, thereby impregnating the electrolyte solution into voids in the electrode. A 0.1 mol/L solution of lithium perchlorate (Example 3) or tetrabutylammonium perchlorate (Example 4) in acetonitrile was used as the electrolyte solution.

A beaker cell 1 like that shown in FIG. 1 was created by setting this thin-film electrode 11 as the working electrode, a platinum electrode 12 as the counter electrode and an Ag/AgCl electrode 13 as the reference electrode within a beaker, and adding therein an electrolyte solution 14 like that described above.

Figure 2:
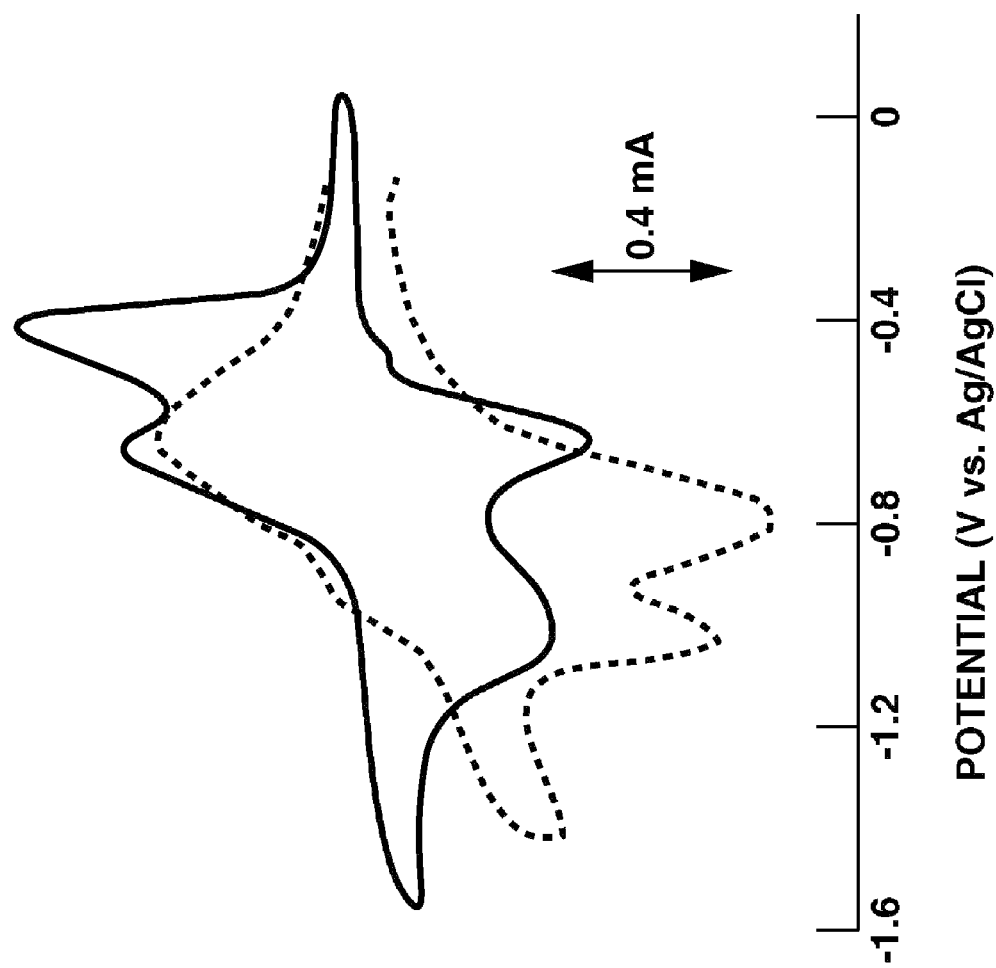
FIG. 2 shows cyclic voltammograms for the thin-film electrodes produced in Examples 2 and 3.

Using this beaker cell 1, cyclic voltammetry was carried out at a sweep rate of 10 mV/sec. The results are shown in FIG. 2. The solid line in FIG. 2 represents Example 3, and the dotted line represents Example 4. As is apparent from FIG. 2, for the thin-film electrode produced using Ion-Conductive Fused-Ring Quinone Polymer A, a two-step redox wave appears at $E_{1/2}$=−0.71 V and −0.97 V when the supporting electrolyte is tetrabutylammonium perchlorate, and redox waves appear at $E_{1/2}$=−0.53 and −0.84 when the supporting electrolyte is lithium perchlorate. These results were stable even after repeated sweeps.

Example 5: Evaluation of Characteristics of Battery Produced Using Ion-Conductive Fused-Ring Quinone Polymer a in Electrode A half-cell in the form of a beaker cell was produced by the method of Example 3 using Ion-Conductive Fused-Ring Quinone Polymer A synthesized in Example 1.

Figure 3:
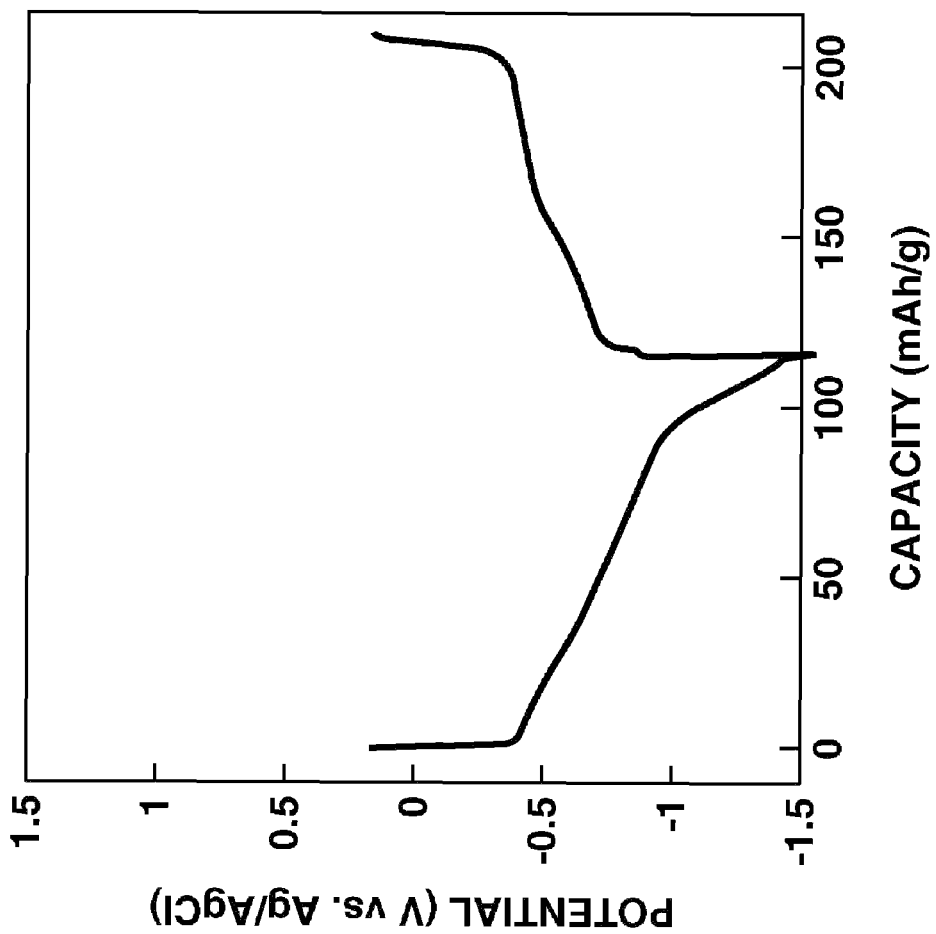
FIG. 3 is a graph showing the results of measurements of the potential difference with a reference electrode when the charge-discharge capacity was varied in the half-cell produced in Example 4.
Figure 4:
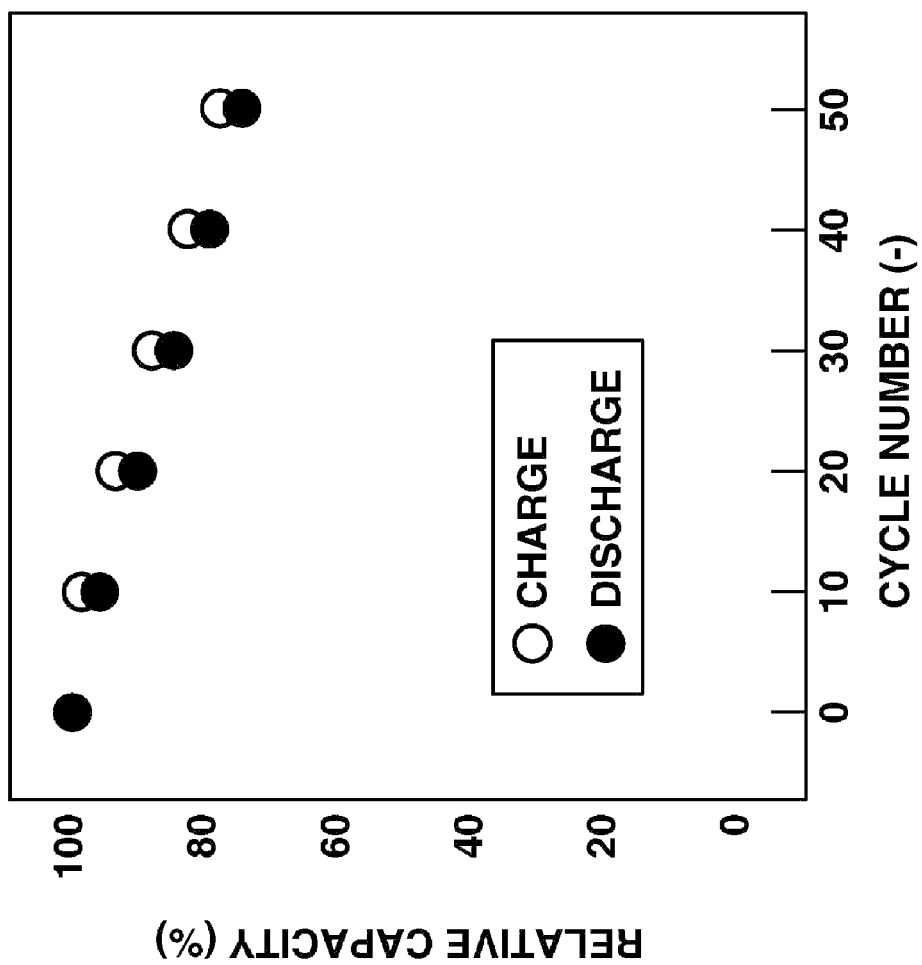
FIG. 4 is a graph showing the charge-discharge cycle characteristics in the half-cell produced in Example 4.

The half-cell was charged at a constant current of 833 µA until the voltage reached −1.45 V, after which discharge at 833 µA was carried out. As a result, the voltage remained substantially constant near −0.55 V for 44 seconds, after which it abruptly decreased and the discharge capacity became 100 mAh/g. The coulombic efficiency was about 90%. This confirmed that Ion-Conductive Fused-Ring Quinone Polymer A functions as an effective charge storage material. Charging was again carried out when the voltage rose to 0.15 V, in addition to which charge/discharge was repeated 50 times in the range of 0.15 to −1.45 V. FIG. 3 shows the results of measurements of the potential difference with the reference electrode when the charge-discharge capacity varied. FIG. 4 shows the cycle characteristics during charging and discharging. A charge-discharge capacity of at least 70% was retained even after 50 charge/discharge cycles.

Example 6: Cyclic Voltammetry of Thin-Film Electrode Produced Using Ion-Conductive Fused-Ring Quinone Polymer A Cyclic voltammetry was carried out using the beaker cell shown in FIG. 1.

First, 80 mg of carbon powder and 10 mg of PVdF powder dissolved in NMP were added to 10 mg of the Ion-Conductive Fused-Ring Quinone Polymer A synthesized in Example 1, and these ingredients were kneaded by a ball mill. The mixture obtained by about 15 minutes of mixing was coated onto a glassy carbon substrate, then vacuum-dried under applied heat at 60° C. for 18 hours, giving a thin-film electrode.

A beaker cell 1 like that shown in FIG. 1 was created by setting this thin-film electrode 11 as the working electrode, a platinum electrode 12 as the counter electrode and an Ag/AgCl electrode 13 as the reference electrode within a beaker, and adding therein an electrolyte solution 14 which is a 10 mol/L aqueous solution of sodium hydroxide.

Figure 5:
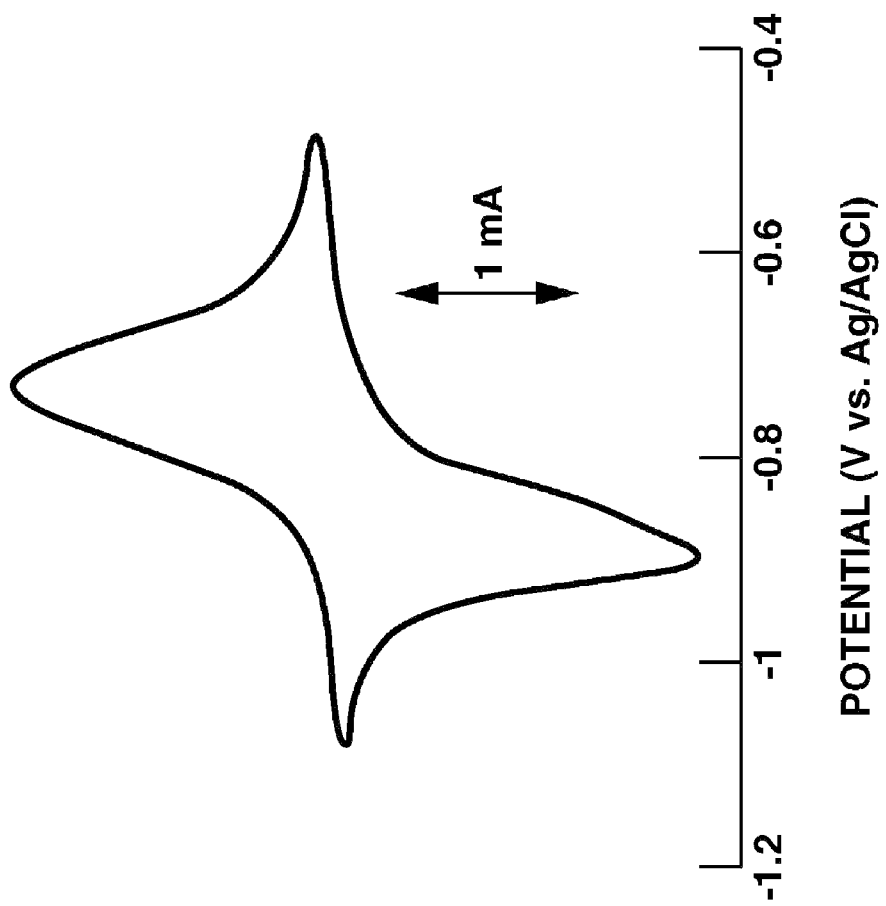
FIG. 5 shows a cyclic voltammogram for the thin-film electrode produced in Example 5.

Using this beaker cell 1, cyclic voltammetry was carried out at a sweep rate of 10 mV/sec. The results are shown in FIG. 5. As shown in FIG. 5, for the thin-film electrode produced using Ion-Conductive Fused-Ring Quinone Polymer A, a one-step redox wave appeared at $E_{1/2}$=−0.81 V. These results were stable even after repeated sweeps.

Example 7: Evaluation of Characteristics of Battery Produced Using Ion-Conductive Fused-Ring Quinone Polymer A in Electrode A half-cell in the form of a beaker cell was produced by the method of Example 6 using Ion-Conductive Fused-Ring Quinone Polymer A synthesized in Example 1.

Figure 6:
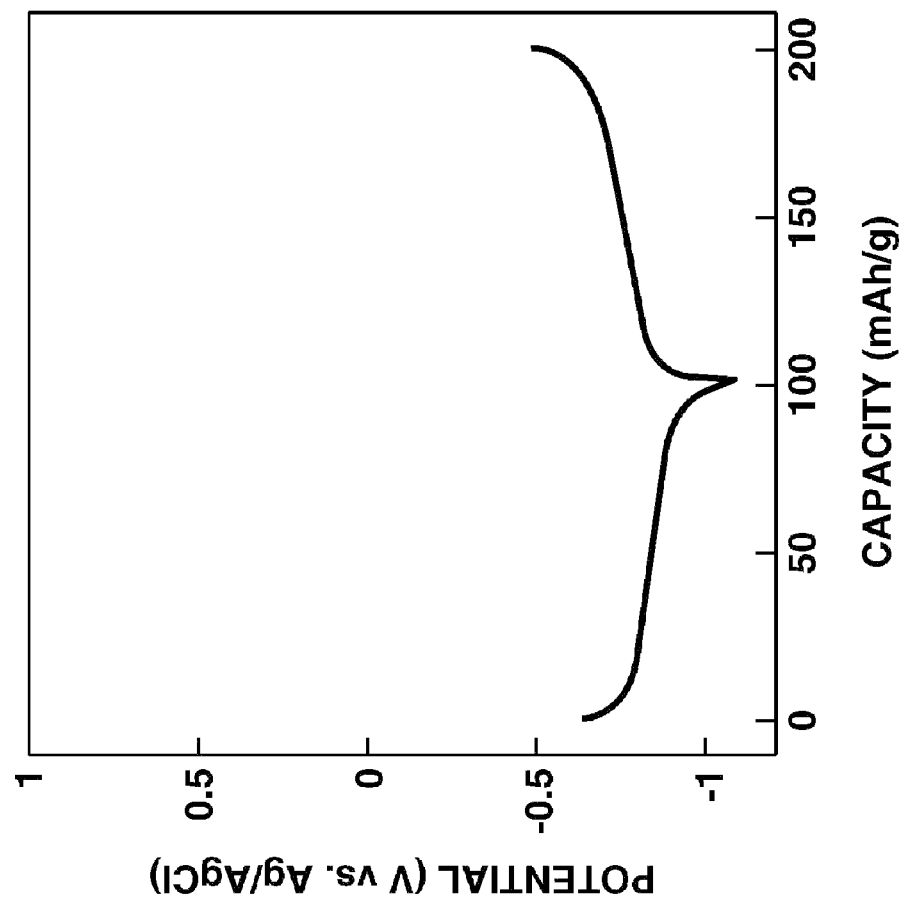
FIG. 6 is a graph showing the results of measurements of the potential difference with a reference electrode when the charge-discharge capacity was varied in the half-cell produced in Example 6.
Figure 7:
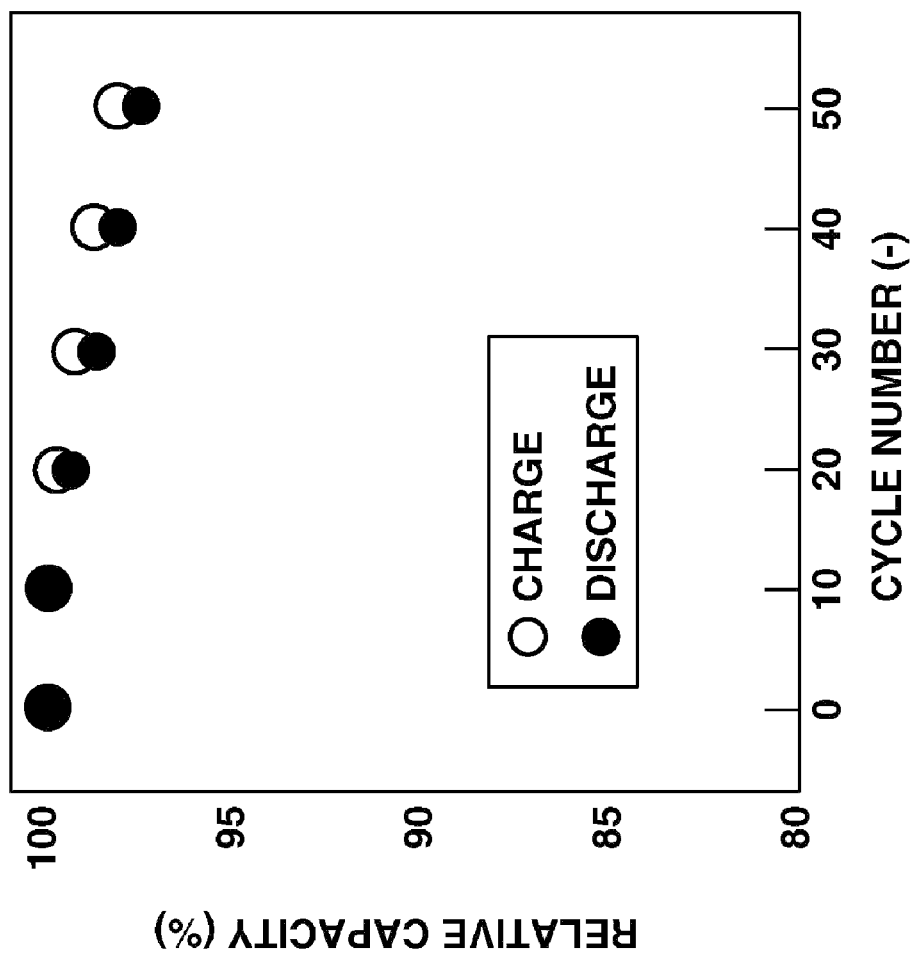
FIG. 7 is a graph showing the charge-discharge cycle characteristics in the half-cell produced in Example 6.

The half-cell was charged at a constant current of 433 µA until the voltage reached −1.1 V, after which discharge at 433 µA was carried out. As a result, the voltage remained substantially constant near −0.82 V for 50 seconds, after which it abruptly rose and the discharge capacity became 102 mAh/g. The coulombic efficiency was substantially 100%. This confirmed that Ion-Conductive Fused-Ring Quinone Polymer A functions as an effective charge storage material. Charging was again carried out when the voltage rose to 0.5 V, in addition to which charge/discharge was repeated 50 times in the range of −0.5 to −1.1 V. FIG. 6 shows the results of measurements of the potential difference with the reference electrode when the charge-discharge capacity was varied. FIG. 7 shows the cycle characteristics during charging and discharging. A charge-discharge capacity of at least 95% was retained even after 50 charge/discharge cycles.

Figure 8:
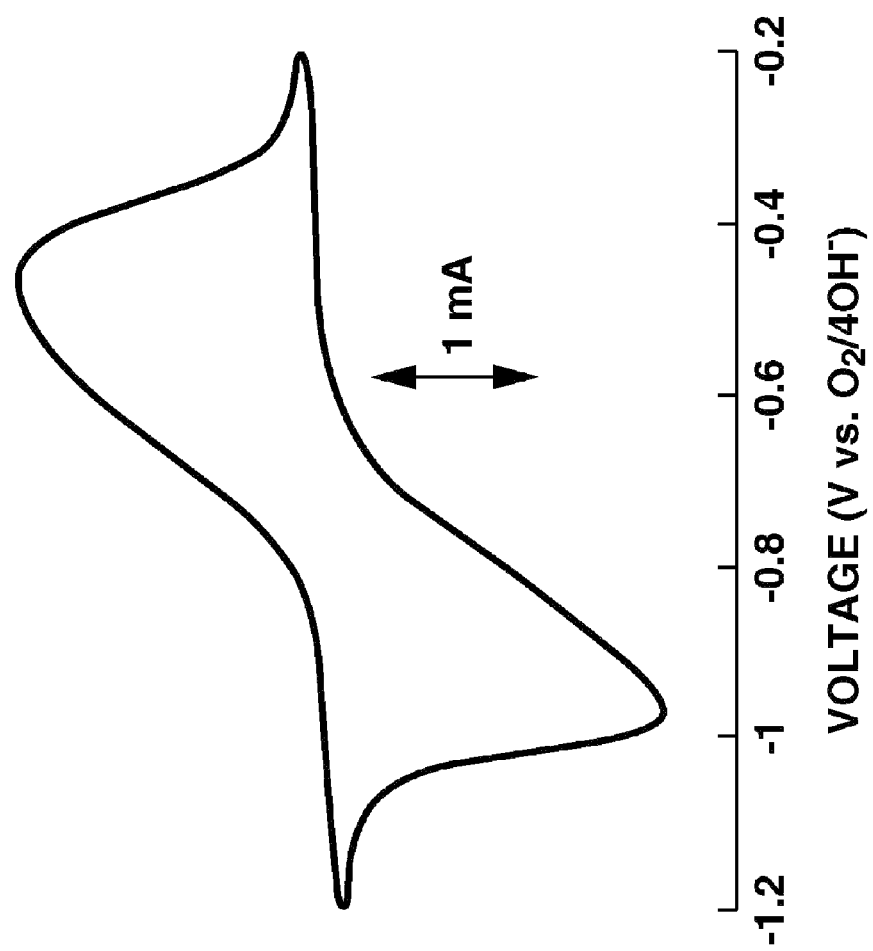
FIG. 8 shows a cyclic voltammogram for the air secondary battery produced in Example 7.
Figure 9:
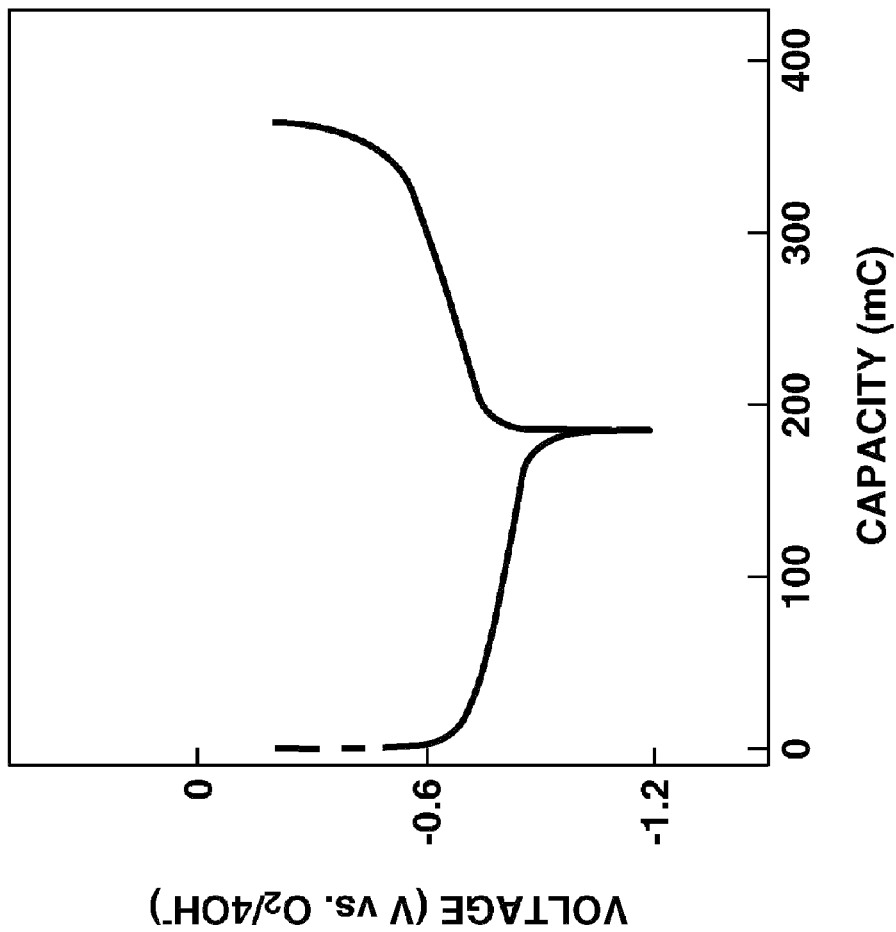
FIG. 9 is a graph showing the results of measurements of the potential difference with a reference electrode when the charge-discharge capacity was varied in the air secondary battery produced in Example 7.

Example 8: Evaluation of Characteristics of Air Secondary Battery Produced Using Ion-Conductive Fused-Ring Quinone Polymer A in Electrode An air secondary battery was fabricated by using a composite electrode of Ion-Conductive Fused-Ring Quinone Polymer A synthesized in Example 1 and carbon as the negative electrode, an oxygen reduction catalyst electrode ($MnO_x$/Carbon, from Electric Fuel Ltd.) as the positive electrode, and a 10 mol/L aqueous sodium hydroxide solution as the electrolyte solution. Cyclic voltammetry was carried out at a sweep rate of 10 mV/sec. A one-step redox wave appeared at $E_{1/2}=-0.77$ V (vs. $O_2/O_2^{4-}$). The results were stable even after repeated sweeps. FIG. 8 shows the cyclic voltammetry results. FIG. 9 shows the results of measurements of the potential difference with the reference electrode when the charge-discharge capacity was varied.

Examples 9 to 12

Air secondary batteries were fabricated using Quinone Polymer A/carbon composite electrodes produced in the same way as in Example 7, but having varying carbon and binder ratios. Table 1 shows the relative capacity (discharge capacity) with respect to the theoretical capacity (120 mAh/g), and the coulombic efficiency in the respective examples. Even when the ratio of Quinone Polymer A in the electrode was set to 50% and binder was not used, a discharge capacity equivalent to the theoretical capacity was exhibited, indicating a coulombic efficiency of substantially 100%. Even when the ratio of Quinone Polymer A was set to 67%, the relative capacity exhibited a high value (70%).

TABLE 1

|  | Polymer A/Carbon/Binder | Relative capacity (%) | Coulombic efficiency (%) |
|---|---|---|---|
| Example 9 | 1/8/1 | 100 | 100 |
| Example 10 | 1/3/1 | 100 | 100 |
| Example 11 | 1/1/0 | 98 | 99 |
| Example 12 | 2/1/0 | 70 | 99 |

Example 13: Evaluation of Characteristics of Air Secondary Battery Produced Using Ion-Conductive Fused-Ring Quinone Polymer B in Electrode Ion-Conductive Fused-Ring Quinone Polymer B synthesized in Example 2 (2 mg) and 0.22 mg of multi-walled carbon nanotubes (Sigma-Aldrich) were added to 800 μL of NMP and dispersed by ultrasonic treatment. The resulting dispersion was drop-cast onto a glassy carbon substrate and vacuum-dried under heating at 120° C., thereby producing a composite electrode.

An air secondary battery was fabricated by using the resulting composite electrode as the negative electrode, an oxygen reduction catalyst electrode (MnO$_x$/Carbon, from Electric Fuel Inc.) as the positive electrode and a 10 mol/L aqueous solution of sodium hydroxide as the electrolyte solution.

Figure 10:
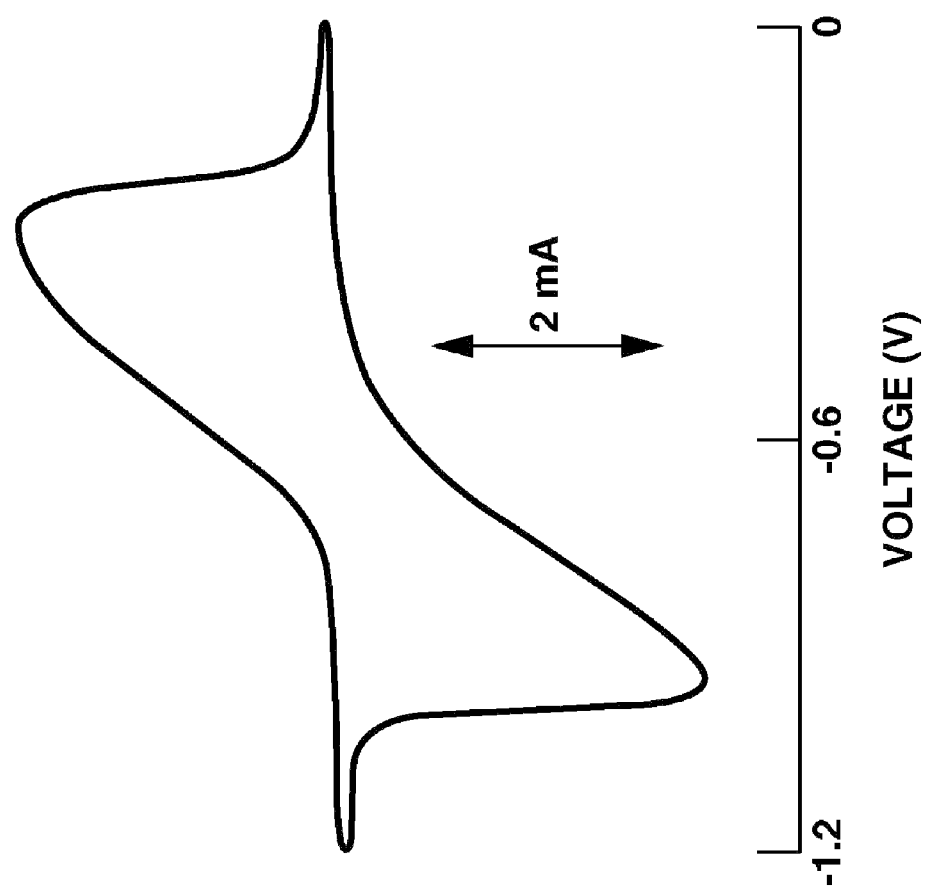
FIG. 10 shows a cyclic voltammogram for the air secondary battery produced in Example 13.
Figure 11:
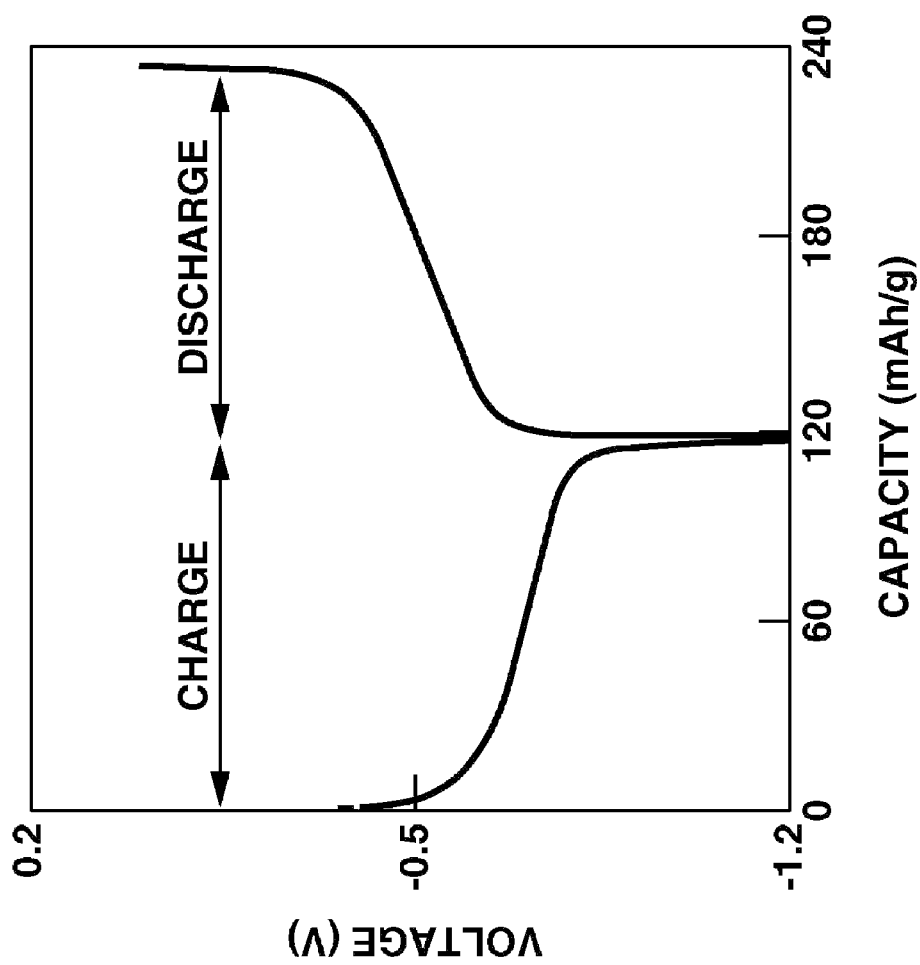
FIG. 11 is a graph showing the results of measurements of the potential difference with a reference electrode when the charge-discharge capacity was varied in the air secondary battery produced in Example 13.

Cyclic voltammetry was carried out at a sweep rate of 10 mV/sec. FIG. 10 shows the cyclic voltammetry results, FIG. 11 shows the results of measurements of the potential difference with the reference electrode when the charge-discharge capacity was varied, and FIG. 12 shows the cycle characteristics when the battery was charged and discharged. Even though a binder was not used and the Quinone Polymer B ratio in the electrode, at 90%, was high, as can be seen from FIG. 11, a high discharge capacity of 119 mAh/g was obtained. The coulombic efficiency was 100%. From FIG. 12, even after 100 charge/discharge cycles, the charge-discharge capacity remained at or above 80%.

One the above-cited publications (*Scientific Reports* 4, 4315-4321 (2014)) mentions that when the ratio within an electrode of a fused-ring quinone-based material having a polyethylene backbone is set to 40%, the capacity significantly decreases compared with when this ratio is 10%, and that the capacity significantly decreases with charge-discharge cycling. It is apparent from the description provided herein that the ion-conductive fused-ring quinone polymer of this invention resolves such drawbacks and exhibits excellent secondary battery characteristics.

Japanese Patent Application Nos. 2015-179550 and 2016-040929 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An ion-conductive fused-ring quinone polymer comprising
recurring units of formula (1) and/or (2) below

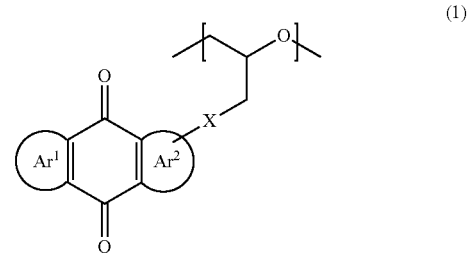

(1)

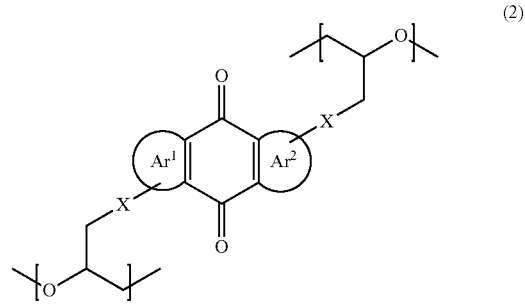

(2)

wherein each X is independently a single bond or a divalent group, and Ar$^1$ and Ar$^2$ are each independently an aromatic hydrocarbon ring or an oxygen atom or sulfur atom-containing aromatic heterocycle that forms together with two carbon atoms on a benzoquinone skeleton, wherein said quinone polymer further comprises
recurring units of formula (3) below

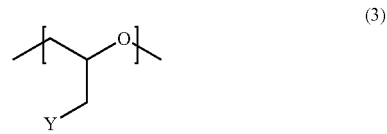

(3)

wherein Y is a halogen atom.

2. The ion-conductive fused-ring quinone polymer of claim 1, wherein the aromatic hydrocarbon ring is a benzene ring and the aromatic heterocycle is a thiophene ring.

3. The ion-conductive fused-ring quinone polymer of claim 2, which comprises recurring units of formula (1'), (1"), (2'), or (2") below

33

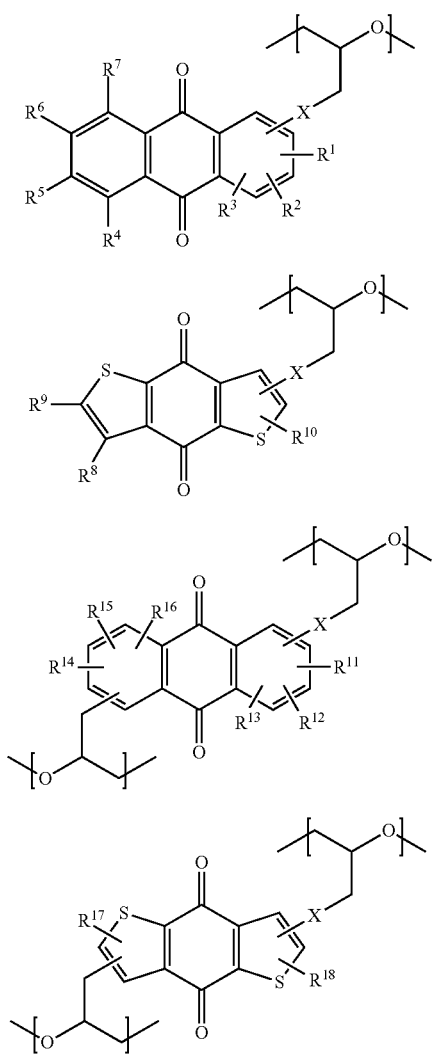

(1')

(1")

(2')

(2")

wherein X is independently a single bond or a divalent group; and $R^1$ to $R^{18}$ are each independently a hydrogen atom, a halogen atom, a hydroxyl group, a mercapto group, an amino group, a substituted or unsubstituted alkyl group of 1 to 12 carbon atoms, a substituted or unsubstituted alkenyl group of 2 to 12 carbon atoms, a substituted or unsubstituted alkynyl group of 2 to 12 carbon atoms, a substituted or unsubstituted aryl group of 6 to 12 carbon atoms, a substituted or unsubstituted heteroaryl group of 3 to 12 carbon atoms, a substituted or unsubstituted alkoxy group of 1 to 12 carbon atoms, a substituted or unsubstituted alkylthio group of 1 to 12 carbon atoms, a substituted or unsubstituted monoalkylamino group of 1 to 12 carbon atoms, a dialkylamino group in which each alkyl group is independently a substituted or unsubstituted alkyl group of 1 to 12 carbon atoms, or an alkylcarbonyl group of 2 to 12 carbon atoms.

4. A charge storage material comprising the ion-conductive fused-ring quinone polymer according to claim 1.

5. An electrode active material comprising the charge storage material of claim 4.

6. An electrode slurry comprising the electrode active material of claim 5 and a solvent.

7. A thin-film produced from the electrode slurry of claim 6.

34

8. A thin-film comprising the electrode active material of claim 5.

9. An electrode comprising the thin-film of claim 8.

10. An electrode comprising the electrode active material of claim 5.

11. A secondary battery comprising the electrode of claim 10.

12. A lithium ion battery comprising the electrode of claim 10.

13. An air battery comprising the electrode of claim 10.

14. An ion-conductive fused-ring quinone polymer comprising
recurring units of formula (1) and/or (2) below

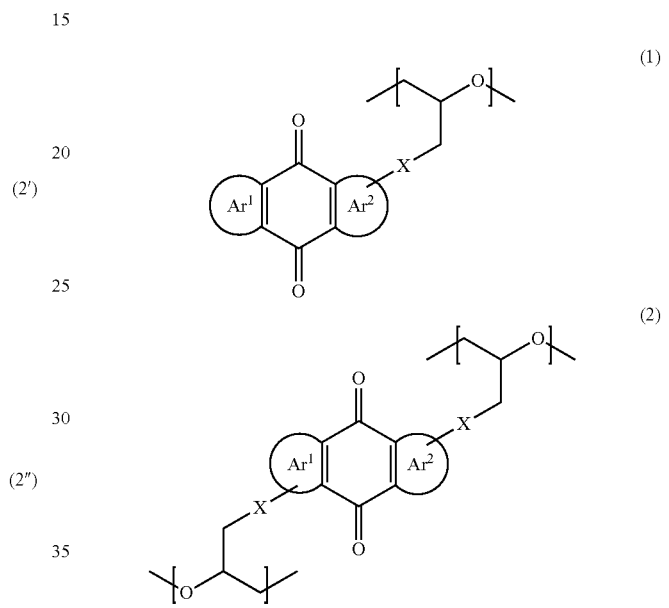

wherein each X is independently a single bond or a divalent group, and $Ar^1$ and $Ar^2$ are each independently an aromatic hydrocarbon ring or an oxygen atom or sulfur atom-containing aromatic heterocycle that forms together with two carbon atoms on a benzoquinone skeleton, wherein said quinone polymer further comprises
recurring units of formula (4) or (4') below

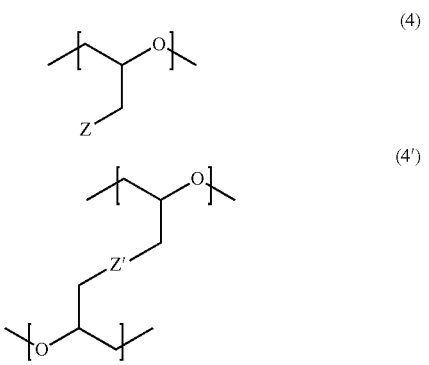

wherein Z is an alkoxy group of 1 to 12 carbon atoms, an alkyl group of 1 to 12 carbon atoms, an alkylthio group of 1 to 12 carbon atoms, an acyl group of 2 to 12 carbon atoms, an alkylamino group of 1 to 12 carbon atoms, a polyalkylene ether group, a polyalkyleneamine group or an aryl group; Z' is —O—(CH$_2$)$_a$—O—, —(CH$_2$)$_a$—, —S—(CH$_2$)$_a$—S—, —C(=O)—(CH$_2$)$_b$—C(=O)—, —NH—(CH$_2$)$_a$—NH—, —O—(R—O)$_c$—, —NH—(R—NH)$_c$— or a phenylene group; R is an alkylene group of 1 to 12 carbon atoms; the letter a is an integer from 1 to 12, the letter b is an integer from 1 to 10, and the letter c is an integer from 2 to 4.

15. A charge storage material comprising the ion-conductive fused-ring quinone polymer according to claim 14.

16. An electrode active material comprising the charge storage material of claim 15.

17. An electrode slurry comprising the electrode active material of claim 16 and a solvent.

18. A thin-film produced from the electrode slurry of claim 17.

19. A thin-film comprising the electrode active material of claim 16.

20. An electrode comprising the thin-film of claim 19.

21. An electrode comprising the electrode active material of claim 16.

22. A secondary battery comprising the electrode of claim 21.

23. A lithium ion battery comprising the electrode of claim 21.

24. An air battery comprising the electrode of claim 21.

* * * * *